(12) United States Patent
Blum

(10) Patent No.: US 6,222,331 B1
(45) Date of Patent: *Apr. 24, 2001

(54) DYNAMO-ELECTRIC MACHINES AND CONTROL AND OPERATING SYSTEM FOR THE SAME

(75) Inventor: Dieter W. Blum, Langley (CA)

(73) Assignee: Global Electric Motor Co. Ltd. (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,375

(22) Filed: Jan. 29, 1998

Related U.S. Application Data

(60) Provisional application No. 60/036,444, filed on Jan. 29, 1997.

(51) Int. Cl.[7] .............................. H02K 29/12; H02P 6/16
(52) U.S. Cl. .................... 318/254; 318/138; 318/439; 318/721; 318/724
(58) Field of Search .................................. 318/138, 254, 318/439, 700–724

(56) References Cited

U.S. PATENT DOCUMENTS

| | | | |
|---|---|---|---|
| 3,131,341 | 4/1964 | Kniazeff | 318/138 |
| 3,858,098 | * 12/1974 | Htsui | 318/138 |
| 4,039,909 | 8/1977 | Baker | 318/197 |
| 4,039,915 | * 8/1977 | Kofink | 318/439 |
| 4,095,148 | * 6/1978 | Parker | 318/138 |
| 4,361,789 | * 11/1982 | Faulhaber | 318/254 |
| 4,591,775 | * 5/1986 | Nussel et al. | 318/711 |
| 4,864,199 | * 9/1989 | Dixon | 318/254 |
| 4,866,364 | * 9/1989 | Chiarion | 318/703 |
| 5,306,996 | * 4/1994 | Yang | 318/716 |
| 5,323,093 | 6/1994 | Kilkuchi | 318/254 |
| 5,424,625 | * 6/1995 | Haner | 318/725 |
| 5,446,354 | 8/1995 | Hiruma | 318/439 |
| 5,747,910 | * 5/1998 | Haner | 310/180 |

FOREIGN PATENT DOCUMENTS

| | | | |
|---|---|---|---|
| 0555151 | 8/1993 | (EP) | H02K/29/00 |
| WO87/02527 | 4/1987 | (WO) | H02P/5/165 |

* cited by examiner

*Primary Examiner*—Bentsu Ro
(74) *Attorney, Agent, or Firm*—Moore & Van Allen; Michael G. Johnston

(57) ABSTRACT

A dynamo-electric machine which can function as a motor or a generator. The machine comprising a stator and an armature, and switching of the armature coils is accomplished by means of a switching control assembly which is mounted to, and rotates with, the armature. In operation as a motor, direct current is supplied through brushes to slip rings that rotate with the armature, and the DC current supplied is first passed through switch means in the control assembly to deliver the current in properly timed relationship with respect to the rotation of the rotor. This provides greater versatility in the operation of the motor/generator and eliminates many of the problems related to the use of conventional brush commutation commonly used in present day DC motors and generators.

12 Claims, 13 Drawing Sheets

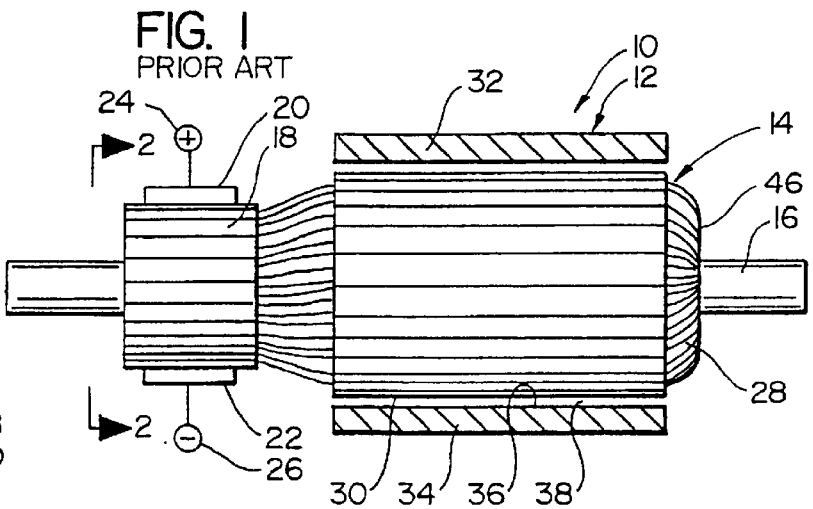
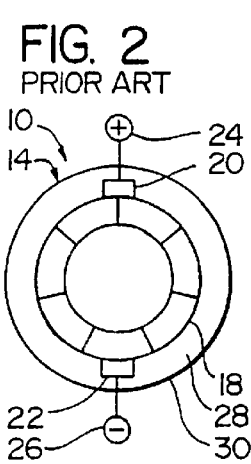
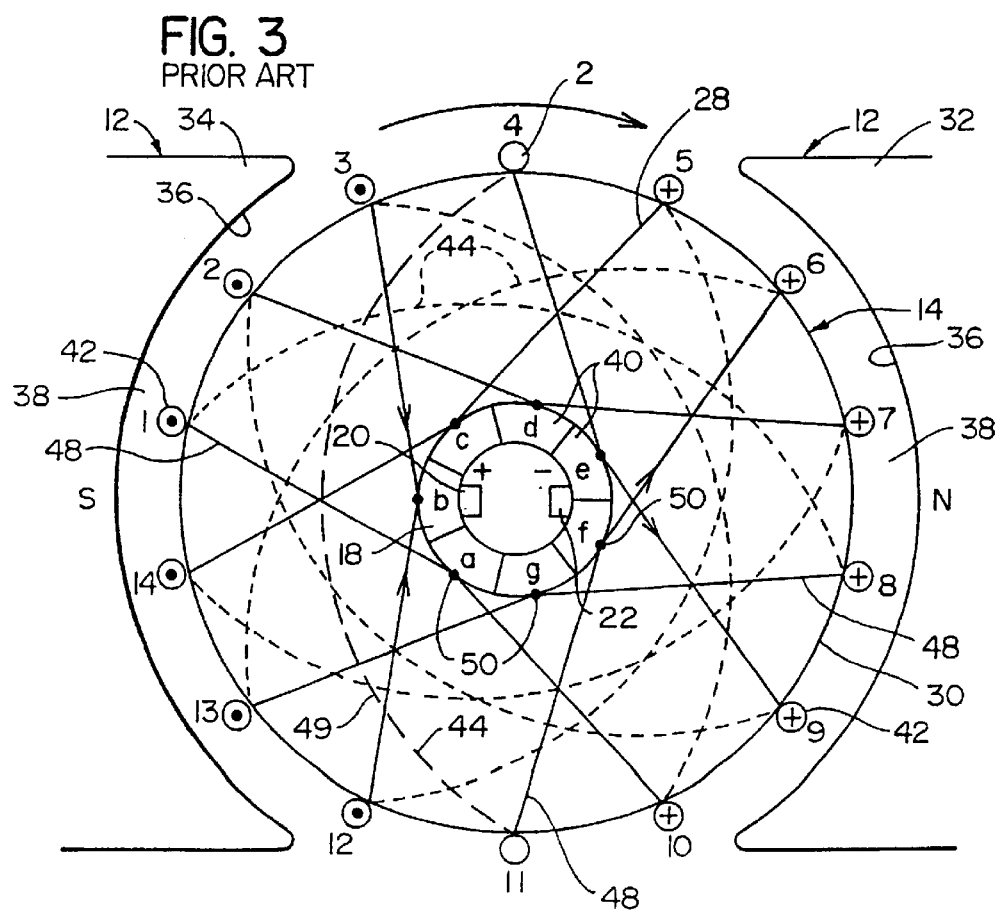

DYNAMO-ELECTRIC MACHINES AND CONTROL AND OPERATING SYSTEM FOR THE SAME

This application claims benefit of the priority of U.S. Provisional Application Ser. No. 60/036,444 filed Jan. 29, 1997.

BACKGROUND OF THE INVENTION a) Field of the Invention

The present invention relates generally to electrical machines (which include both motors and generators), and more particularly to a system (apparatus and method) for providing power to the machine components and a control and operating system for the same. More particularly, this relates to such a machine and system which does not use brush commutation, and which provides optimized performance of the machine, and also enables the overall design of the machine itself to be improved for better performance.

One of the more common electrical machines used for various industrial applications is the conventional commutator controlled DC motor having a stator with at least one set (pair) of oppositely positioned fixed north and south poles, and a rotor positioned between the poles. The rotor is wound with coils that extend parallel to the axis of rotation of the rotor and are positioned at circumferentially spaced locations around the rotor.

Electric power is supplied to the coils of the rotor through the commutator which is interconnected with the rotor and rotates with the rotor. An outside DC power source is connected to the commutator rotor through stationary brushes positioned on opposite sides of the commutator and in electrical contact therewith. The commutator is made up of segments which are in turn connected electrically to the coils in the rotor. Thus, with rotation of the rotor, power is fed from the two brushes to the commutator segments in a predetermined sequence so that the electric current flows through each coil in one direction during one portion of the rotational path of travel of the rotor, and then in the opposite direction during the other portion of the rotational path of the rotor. The commutator is arranged so that the magnetic fields created by the coils interact with the field created by stator to cause the rotation of the rotor.

Such commutator controlled DC motors have several desirable features for various industrial applications. One significant advantage is that this motor can develop very high torque at startup thus providing a significant advantage over other types of electric motors, such as synchronous motors operating from alternating current. Another advantage of such commutator controlled DC motors for some applications is that the rotational speed of the rotor can be easily changed to match certain operating requirements. For example, the motor can develop very high torque at slow speed, and yet under other circumstances, it can operate at much higher speeds.

However, the commutator controlled DC motors have certain drawbacks, and some of these relate to the problems associated with the commutator and the brushes. It is necessary that the commutator segments be spaced at least a short distance from one another to avoid arcing between adjacent commutator segments.

However, the brushes must constantly be creating and breaking electrical contact with the rotating commutator segments. This creates maintenance problems. Also, higher costs are involved due to the commutator and brush rigging assembly and other factors. Another drawback is that because of the possible sparking, these are not used in environments where sparking would be hazardous. The practical consequence is a widespread desire to avoid the mechanical commutator apparatus altogether.

Another drawback related to the brush/commutator control system is that the positioning of the switch-over points is usually a compromise in accordance with the operating conditions of the motor. Ideally, if the motor is operating at a given desired power output and at a given speed, the brushes can be placed at optimized locations so that the switch over of the current supplied to the coils is perfectly timed to optimize the efficiency and other performance characteristics of the rotor. However, if the motor is heavily loaded so that it is required to develop high torque, the rotor will "lag". The reason for this is that when the rotor is developing high torque, the entire magnetic field between the north and south poles of the stator will bend or distort in a direction opposite to the rotation of the rotor. Thus, in terms of the operating effect of the magnetic fields created, the north and the south poles of the stator actually shift. Also the rotational speed of the motor can affect the optimized position of the brushes.

Ideally, the commutator brushes should be shifted accordingly so that the switch-over point becomes optimized for that mode of operation. Various attempts have been made in the prior art to mechanically shift the brushes or compensate for this situation in other ways, but in large part these attempts have not been successful and/or commercially feasible. Accordingly, quite often the commutator and brushes are placed at a compromise position to accommodate for the various operating conditions that are expected for the motor.

However, beyond this, in a commutator controlled DC motor, the entire machine design must be compromised in certain respects because of the inherent operating characteristics of the motor. Due to the fact that there is the potential for sparking between the brush and the commutator segments, there is a limit to the level of voltage that can be applied to this type of motor. Also, the air gap between the armature and the rotor has to be greater than a certain minimum distance, because of the induced voltages caused by the commutation of a coil (short circuit) in the coils tends to cause sparking between the commutator segments. One of the disadvantages in having this larger gap is that it increases the reluctance of the magnetic path across the path across the air gap, and thus decreases the torque that can be developed by the motor. This exacerbates the matter by this causing other complications, such as greater distortion of the field when the motor is operating under a heavy load.

DC generators are substantially the same as (or at least closely similar to) DC motors, but operate in a reverse mode. In other words, in the generator the power input is generally through a rotating shaft, and the output is a DC current. In large part, the same advantages and disadvantages that are inherent in DC motors are also present in DC generators.

Given these disadvantages of such DC motors, one would be led to believe that a motor operating on alternating current would be more desirable, since these do not have the commutator and brush interaction (thus enabling higher voltage machines, with less power loss), and also permitting one to be better able to optimize the motor designs with minimum air gaps and maximum field strengths. To some extent this is true, and such motors have found wide commercial use for some applications. However, such motors operating off alternating current typically suffer from slip, severe lack of start up torque, and a difficulty of control in terms of variable speed.

In view of this, it is the object of the present invention to provide an improved control system for electric machines in general, and particularly with certain types of electric engines to which the present invention is well adapted to alleviate in large part problems such as described above. Also, the present invention in addition to providing an improved power and control system for electric motors and generators, further comprises, in combination, an electric motor having an optimized design to maximize the benefits provided by the present invention in permitting the motor or generator itself to be designed more effectively, and also to enable more efficient (and in some instances more versatile) operation.

SUMMARY OF THE INVENTION

The present invention relates to dynamo-electric machines, which can operate either as a motor or as a generator. The current flow in the coils of the machine can be optimized to accomplish efficient power transfer, and to alleviate many of the problem existing in the prior art.

The present invention comprises a dynamo-electric machine which comprises a field member and an armature assembly.

The field member has north and south magnetic portions to create a flux field extending between the magnetic pole portions.

The armature assembly is rotatably mounted in the machine to rotate through the flux field. The armature assembly comprises:
a. a core position in the flux field;
b. coil means comprising a plurality of induction coils positioned adjacent to said core and positioned to move through the flux field during location of the armature assembly;
c. switch means mounted to the armature assembly so as to be rotatable therewith. The switch means is operatively connected to the coil means, in a manner that current can be caused to flow selectively through the coil means to cause a desired interaction of the coil means in the flux field.

There is mechanical transfer means connected to the armature assembly so as to be rotatable therewith in power transmitting relationship. There is also electrical power transfer means having an operative power connection with the switch means, so that current between the electrical power transfer means and the coil means is selectively controlled by the switch means.

In addition, there is control means to operate the switch means to control direction and timing of current in said coils.

In a preferred embodiment of the present invention, the electrical power transfer means is a direct current electric power transfer means. Also in a preferred form, the electrical power transfer means comprises slip ring means rotatably mounted to the armature assembly and brush means operatively engaging the slip means.

Also, in the preferred form, the control means (or a substantial portion of the control means) is positioned in the armature assembly, so as to be rotatable therewith, and control signal to the control means can be transmitted through the electrical power transfer means.

There is provided field sensing means positioned relative to the flux field to ascertain orientation and/or other characteristics of the flux field. The sensing means is operatively connected to the control means to enable the control means to modify timing and/or other operation of the switch means to accomplish a proper relationship with the switching relative to the flux field.

In a more specific form, the sensing mean comprises a plurality of sensors positioned adjacent to related coils to sense current change and/or condition in related coils. In one specific embodiment, each of the sensors comprises sensor coil means responsive to the flux field, and means responsive to voltage changes in the sensor coil means to send a corresponding signal to the control means.

In one operating mode, the machine functions as a motor where DC current is directed through the electrical power transfer means to supply power to the armature assembly and cause rotation of the mechanical transfer means.

In another mode, the machine is operated as a generator, and power is delivered to the mechanical transfer means to cause rotation of the mechanical transfer means so as to generate electricity in the armature assembly which is transmitted to the electrical power transfer means. In several embodiments, the field member comprises status north and south magnetic pole portions so as to provide a status magnetic field.

In another embodiment, the field member generates a moving flux field which moves circumferentially around the field member.

Other features of the present invention will become apparent from the following detailed description.

BRIEF DESCRIPTION OF THE DRAWINGS

FIG. 1 is a side elevational view of a prior art commutator controlled DC motor, shown partly in section;

FIG. 2 is a sectional view taken along line 2—2 of FIG. 1, and showing the commutator and brushes;

FIG. 3 is a somewhat schematic view illustrating the coils of the rotor of the prior art motor, the commutator, and the electrical connections therebetween;

DESCRIPTION OF THE PREFERRED EMBODIMENT

Figure 4:
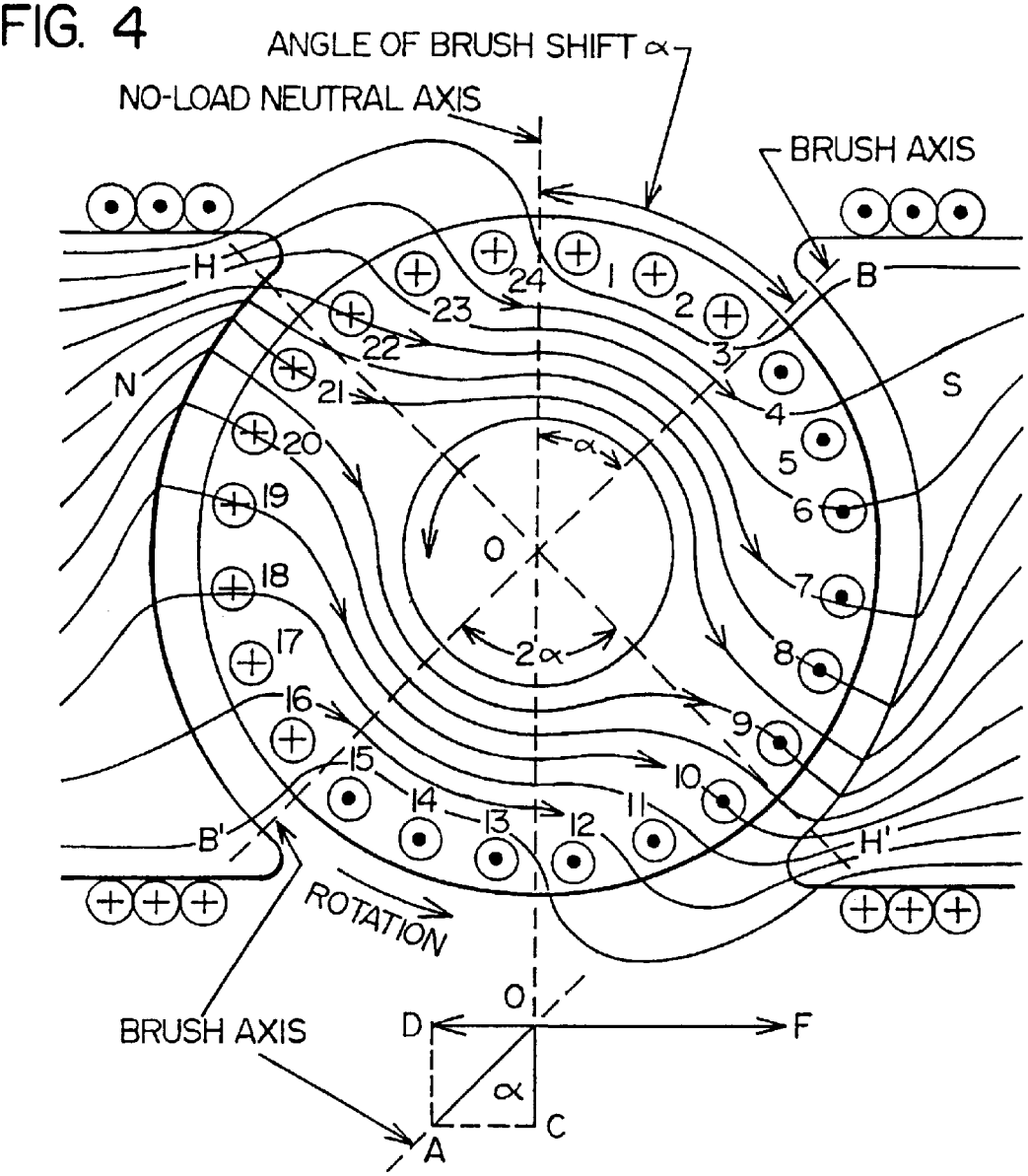
FIG. 4 is a cross sectional view, similar to FIG. 3, illustrating the prior art motor operating under load, along with the resulting shift in the stator field.

It is believed that a clearer understanding of the present invention will be obtained by first describing in more detail a typical prior art commutator controlled DC motor, such as described in the earlier portion of this text entitled "Background of the Invention", followed by a further section describing the prior art in general and how this applies to the operating characteristics, advantages and disadvantages of the prior motor (or generator).

After that, there will be a more detailed description of the present invention. In the following description, it is to be understood that while the preferred embodiment are in many instances called a "motor" (or described as being used in a motor), this same apparatus can be used as a generator. Thus, the apparatus is referred to as "an engine" in part of the text, and in other parts more specifically to a "motor". It is to be understood, however, that when the term "motor" is used, in most instances this would apply just as well to using this apparatus (i.e. engine) as a generator.

As a further preliminary comment, in the following two sections references will be made to the book "Electrical Circuits and Machinery", Volume 1, on Direct Currents, authored by Mr. Frederick Hehr and Mr. George Harness, both of Columbia University. This book bears a copyright notice dated 1940.

This book provides an informative description of the "dynamo-electric machine" (including both the generator and the motor), and also explains many of the practical aspects in the design and operation of such apparatus. Further, it discusses the different types of motors/generators, the advantages and disadvantages of each, the operating problems encountered, the attempts to solve these, and various applications where the different types of motors/generators would make a good fit, etc.

It is most interesting to note that although the book was published approximately 58 years prior to the year in which the text of this patent application is being prepared (1998), the contents of this book are in large part quite relevant and informative regarding the advantages, disadvantages, problem areas (and possible solutions of the same) that exist in present day electric machines. The problems and limitations of commutation are discussed in this 1940 treatise in pages 236 through 248. In large part, these still exist in today's technology. In Chapter VII of that book, "The Direct-current Motor", there is a description of the various types of DC Motors and their characteristics. On page 334 of that chapter there is discussion of the considerations relevant to start-up of the motor from the time the motor is stationary, and the apparatus required. Again, these same considerations are present with today's electric motors.

Thus, even though these operating limitations and problems have been known and analyzed for many decades, and even though there have been certain advancements in the industry to make improvements and adapt to the limitations, the underlying problems and limitations still remain in the present technology relating to electrical machines.

a) Description of a Prior Art Commutator Controlled DC Motor

With reference to FIGS. 1 through 3, there is shown a prior art motor 10 comprising a stator 12 and a rotor 14. The rotor 14 comprises an output shaft 16, a commutator 18, and a pair of brushes 20 and 22. To supply current to the rotor 14 through the commutator 18, the brush 20 is connected to a positive power supply 24, and the brush 22 is connected to a negative power source 26.

The rotor 14 has an overall cylindrical configuration, and there is a plurality of coils 28 wound around the rotor core 29, so that these coils extend longitudinally, parallel to the axis of rotation of the rotor shaft 16. The coils 28 extend along the full length of the rotor, and are positioned at evenly spaced circumferential locations, around substantially the entire cylindrical surface 30 of the rotor 14.

The stator 12 comprises north and south pole sections, 32 and 34, respectively positioned on opposite sides of the rotor 14. Each of the pole sections 32 and 34 have concavely and cylindrically curved pole faces 36, and each pole face or surface 36 defines with an adjoining surface portion of the cylindrical surface 30 of the rotor 14 a related cylindrically curved gap 38.

Reference is now made to FIG. 3 to illustrate the manner in which the coils 28 are wound in a typical commutator controlled DC motor. (this is shown on page 200 of the aforementioned book "Electrical Circuits and Machinery"— Volume I, Direct Currents)

In the following several paragraphs there will be a somewhat detailed description of the manner in which the current flows through the seven coils 28 and the commutator segments 40. It is believed that this review of the operation of the prior art motor will better enable the reader to appreciate the differences in the mode of operation of the present invention compared with the prior art, and also the advantages which can be obtained by the present invention over the common prior art arrangement.

In the particular motor shown herein, there are seven coils 28, and the commutator 18 accordingly has seven segments 40, which are designated by the letters "a1" through "g". The commutator segments 40 are of the same arcuate length and these are located at evenly spaced intervals around the commutator. As shown in FIG. 3, the brushes 20 and 22 are positioned inside the commutator 18, and this is simply done for purpose of illustration. Normally, the brushes 20 and 22 are positioned on the outside of the commutator, as shown in FIGS. 1 and 2.

In this particular drawing of FIG. 3, each coil is shown as comprising only a single winding, and each winding comprises a pair of inductor sections 42 positioned diametrically opposite to one another on opposite sides of the core 29 and connected directly to one another at one end by a coil section 44 shown in broken lines in FIG. 3. Thus, the coil 1-8 comprises two inductor sections, namely section 1 and 8, and these being shown schematically as a circle to represent the cross section of the coil section. Section 1 shows a dot in the middle of the circle, which indicates that the current is flowing upwardly from the surface of the page, while section 8 shows a plus sign which indicates that the current is flowing downwardly toward the surface of the page. Coil 8 connects through a solid line 48 to the commutator segment "g", while section 1 connects by another solid line 48 to the commutator section a. As indicated above the bottom ends of inductor sections 1 and 8 are interconnected by a coil portion which is indicated by the broken line 44. The two inductor sections 1 and 8 extend parallel to the longitudinal axis of the rotor 18. This same description applies to the other coils 2–9, 3–10, etc.

These coil sections 1–14 28 are connected through the commutator 18 in series in the following manner. Let us begin at the connecting point 50 of the commutator segment F and travel downwardly from that point along the solid line connection 48 to the coil section 11, and then back along the broken line 44 to one end of the coil section 4. The other end of the coil section 4 extends as a solid line to the connecting location at the commutator segment "e". It will be noted that at that particular location, the two commutator segments "e" and "f" are shorted out by the negative brush 20. Thus, no current is flowing at that particular instance through the coil sections 4 and 11.

To follow this further, let us now follow the flow of current from the commutator segment "e" to the coil section 9, across to the coil 2, and then back to the commutator segment "d". We will see that the series of connection is as follows, e-92-d-7-14-c-5-12-b-3-10-a-1-8-g-13-6-f-11-4-e. Thus, it can be seen that all of the coils are connected end to end in series. It will be noted that in the particular position of FIG. 3, only the commutator segment b is connected to the positive terminal. An analysis of the above connections will indicate that there is a flow of current through various coils from the commutator segment e back to the commutator segment b. This can be seen by looking at the series of connections in the paragraph immediately above which begins with "b" and proceeding to the right toward the coil location "a" and then to the various connecting locations all the way to the computer segment "e". This can be seen by looking at the series given initially above and proceeding from "e" as follows - - - e-9-2-d-7-14-c-5-12-b. Then there is also a flow of current between the commutator segments f and b as follows . . . f-6-13g-8-1-a-10-3-b. As indicated above, the commutator segment "e" is shorted out to the commutator segment "f" by the brush 22.

From the above, it can be seen that as the rotor 14 rotates further from the position in FIG. 3 in a clockwise direction, the commutator segments "a" and "b" will both be in contact with the positive brush 20, so that the two connecting points of the coils 3 and 10 will have their two connecting segments "a" and "b" shorted out, so that no current will be flowing through the coil 3–10.

However, as the rotor 14 continues to rotate to another ¹⁄₁₄th of 360°, the coil sections 3 and 10 will then be in the position that the coil sections 5 and 12 presently occupy in FIG. 3, and current will again begin to flow in the coil sections 3 and 10, but in the opposite direction.

If, at the time a coil is short-circuited by a brush, the coil is cutting across lines of flux an appreciable voltage will be generated in the coil, and a large current will circulate through the path made up of the coil, the commutator segments, and part of the brush itself. This "short-circuited current", as it is called, can under some circumstances produce disastrous sparking at the brush contact. For this reason, the brushes must be placed on the commutator so that the coil which they short-circuit occupies such a position in the stator magnetic field that little or no voltage is induced in it while it is short-circuited.

It is to be understood that the winding pattern shown in FIG. 3 is somewhat schematic, and in an actual commercial machine, somewhat different winding patterns may be used. A number of different windings are illustrated in the Hehr and Harness book, and there are shown various multiple circuit windings, wave or series windings, etc. Also, while only two poles are shown in FIG. 3 (and also in this preferred embodiment), there could be (particularly for larger engines) a much larger number of poles.

b). Discussion of the Operating Characteristics of the Prior Art DC Motor of FIG. 3

Much of the description that follows is based upon the information contained in the aforementioned publication "Electric Circuits and Machinery" by Hehr and Harness. Accordingly, in the text that follows in that section, occasional reference will be made to specific pages and sections in that book.

i. Commutation

When each of the coils reaches a position where there is to be current reversal in that coil, the coil is short-circuited through the commutator. the time in which the reversal of current takes place in a short-circuited coil is very short.

For example, in a commutator where the diameter is about ten inches, and the rate of rotation is twenty revolutions per second, the time interval available during which the current must reverse fully would be on the order of one one thousandth (0.001) of a second.

This time period during which a coil is short-circuited by the brush depends upon the peripheral speed of the commutator, the thickness of the brush, and thickness of the insulation between commutator bars. The thickness of the insulation is never greater than fifteen percent of the thickness of a commutator bar or segment. The commutation time could be extended by using thicker brushes (i.e. a brush which has a greater arcuate length), but if these are used commutation would begin before the coil is moved out from under a main pole while the coil was still generating voltage.

During this rapid change of current as indicated previously, the magnetic field around the coil is rapidly collapsing. If the commutation is not properly accomplished, this results in a high voltage spike, which can cause sparking. The effect of sparking is to cause wearing at the receding edges of the commutator segments and at the trailing brush tips. This is illustrated in FIG. 4, which is derived from a figure printed on page 242 of the Hehr and Harness book.

In that same book, there is discussed various methods for alleviating the possible problems in commutation. One is EMF commutation where an electromagnetic force is generated at the fringe of the pole. The brushes are advanced on the commutator so that the short-circuited coil lies in edge of the magnetic field under the pole tip. Another method is to use commutating poles, which makes brush shifting unnecessary, since the proper commutating flux is brought to the short-circuited coil. To accomplish this, small poles with a series winding are placed midway between the main poles.

ii. Armature Reaction (Distortion of the Magnetic Field)

Figure 5:
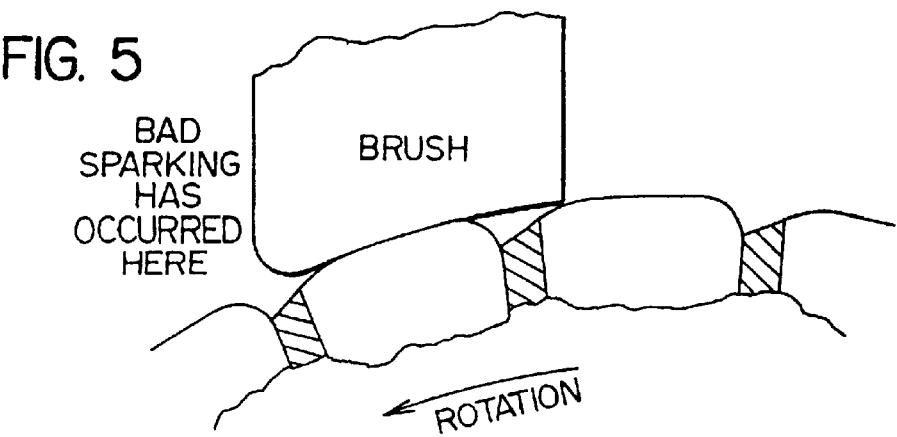
FIG. 5 is a simplified view showing a single commutator brush engaging the commutator, and also showing the damage to the commutator segments due to sparking.

The armature itself tends to set up a magnetic field aligned about 90° to the magnetic field set up by the stator. The effect of this is to distort the static field, and this is illustrated in FIG. 5 (derived from figures shown on page 252 of the Hehr and Harness book). The distortion is somewhat exaggerated in this particular figure, but it can be seen that there would need to be shifting of the brushes to have them in the proper location so that commutation can properly take place.

As discussed previously under "Background of the Invention", when the motor 10 is operating under a heavy load, the rotor 14 will tend to lag. In the arrangement shown in FIG. 3 with the rotor 14 rotating in the clockwise direction, the rotor will lag in a counterclockwise direction, and the centers of the north and south fields of stator poles 32 and 36 will effectively shift in a counterclockwise direction. As indicated previously, the shifting of the position of the brushes 20 and 22 to shift the switch over point for various operating conditions has generally not proven to be practical for many (if not most) industrial applications. Accordingly, the setting of the brushes 20 and 22 tends to be something of a compromise.

iii. Types of Direct Current Motors

In Chapter 7 of the Hehr and Harness book, there is described (beginning on page 316) the main three types of DC motors, namely "shunt", "series", and compound". In the shunt wound motor, the field consists of many turns of fine wire and is connected in parallel with the motor armature.

In the series motor, the field winding has a few turns of heavy wire connected in series with the armature.

In a compound motor there are two sets of field coils; one of many turns of fine wire and parallel with the armature, and another of a few turns of heavy wire in series with the armature. The series winding of compound motor may be connected so that it assists the shunt winding in magnetizing the field, or it may be connected so that the mmf's of the two winding oppose one another.

Figure 6:
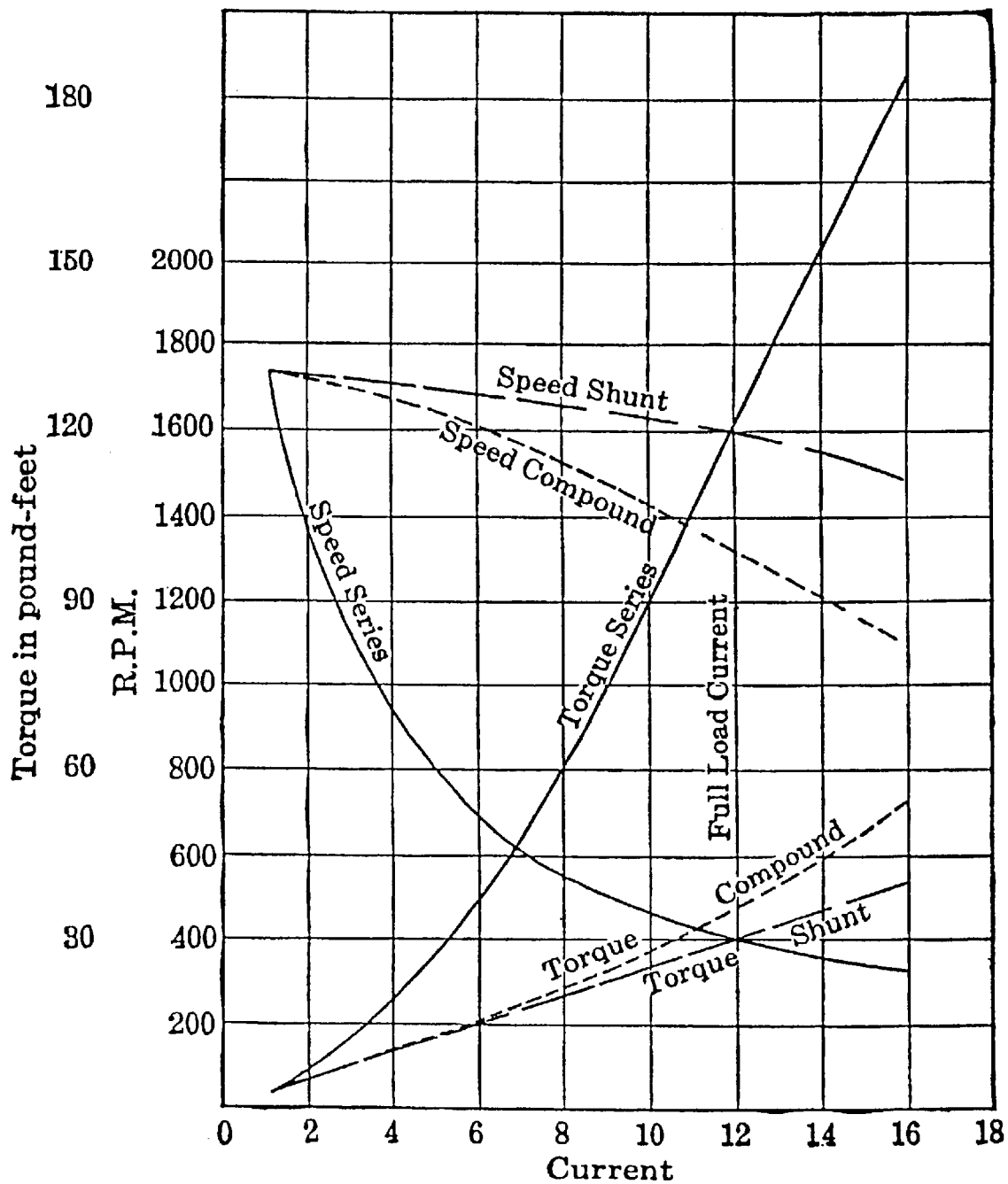
FIG. 6 is a graph illustrating the operating characteristics of three different types of DC motors.

The characteristics of the three types of motors are as follows:

a. The shunt motor has a fair starting torque and has relatively less variations in speed for changes in loads. It is used where the load requires a more constant speed and the starting torque demanded is not excessive.

b. The series motor operates through a wide range of speed as the load changes. In very light loads the motor is likely to "run away". It gives very great starting torque and is therefore used where a heavy starting torque is demanded, and where the motor may be positively connected to its load.

c. The compound motor has characteristics between those of a shunt and a series motor and hence has a starting torque greater than that of the shunt motor, but less than that of the series motor. In FIG. 6, which is derived from the figure of page 326 of Hehr and Harness book, the speed and torque characteristics of the three types of motor are shown, where the torque values are along the vertical axis, and current is along the horizontal axis.

iv. Start Up of the DC Motor

When a DC motor is in operation, the current that flows through the inductor coil sections experiences a voltage drop which is the summation of two voltages, (a) the voltage drop component due to the resistance of the wire, and (b) the back EMF resulting from the inductor coil sections passing through the flux field of the stator. Current losses equal $I^2R$, where I is the current and R is the resistance. The $I^2R$ losses in an electric motor are simply losses, and these are dissipated as heat. Thus, if the current reaches too high a level, it will burn out the motor.

Let us now examine the practical effect of this in the circumstances where the DC motor is stationary and is to be started. If the stationary armature of a shunt motor is connected directly with the supply line, the current which will flow in the armature current is calculated from the following equation $$E = E_C + I_a R_a$$

where E is the total voltage drop $E_C$ is the back EMF generated by the coil $I_a$ is the armature current $R_a$ is the resistance of the coil Let us now take the example of a 110 volt motor, where the current for full load is 40 amperes and the armature resistance of the motor is about 0.2 ohm. When the motor is operating at full power at a rotational speed for which it is designed, most of the voltage drop across the armature coils would be due to the back EMF generated in the coils. However, when the motor is stationary and there is no back EMF, and with 110 volts being applied across the armature, the current through the armature would be 110/0.2, which equals 550 amperes, whereas the full load current is only 40 amperes. This current of 550 amperes would burn out the brushes, commutator, and winding, and would also blow the fuses and circuit breakers in the supply line.

However, after the motor is running, there is no excessive current flowing through the armature because the current is limited by the back EMF. But while the armature is accelerating, the counter EMF is small and some other means must be employed to limit the starting current.

Figure 7:
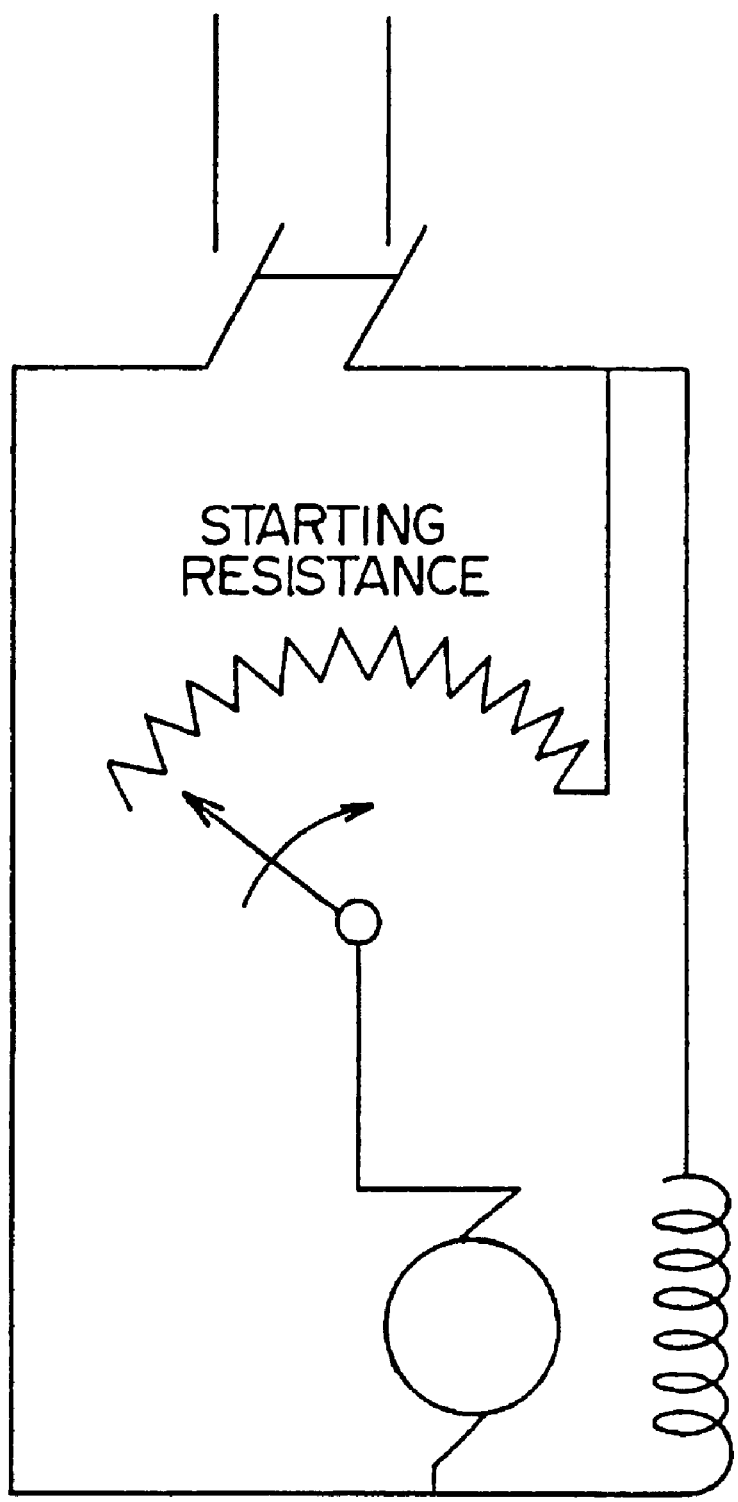
FIG. 7 is a schematic view illustrating a prior art DC motor with a starting rheostat.

There are several devices described in Chapter 7 of the Hehr and Harness publication to resolve this problem, and one of these is shown somewhat schematically in FIG. 7, and derived from the figure shown in page 335 of the Hehr and Harness publication. A rheostat is placed in series with the armature. If the current in the armature is to be sixty amperes of the start (150% of the full load current), the total resistance of the armature circuit must be 110/60, which equals 1.83 ohms. As a rotational speed of the motor increases, then the setting of the rheostat can be moved to lower the resistance until the motor is up to speed, and at that time the rheostat effectively drops out of the circuit.

The torque developed by the motor is directly related to the strength of the magnetic fields, and the strength of the magnetic fields are directly related to the amount of current flowing in both the stator windings and also the armature coils. Assuming the current in the stator winding is constant, and in this example the current flowing in the armature is 60 amps (150% of design current), then the armature as it is just starting is developing a very high torque (presumably 150% above the torque it would develop at full power at the design speed). However, since the rotational speed is very slow, and since power output equals force times distance, even though the torque is very high, the effective work done is rather low. However, the wasted energy is extraordinarily high and this is being dissipated in rheostat. As the rotational speed of the motor increases, assuming the current stays substantially constant, the power output of the motor goes up in proportion to the rotational speed, and the losses that are dissipated in rheostat diminish.

In the Hehr and Harness text on page 335, there is mentioned a starting rheostat being in a starting box, and states the following:

"The wires of which the starting box resistance is composed are imbedded in sand or enamel or wound on porcelain tube; they are then enclosed in fireproof material, so that, if the operator keeps the starting resistance in the circuit for a longer time than that for which it was designed, thus overheating and possibly melting the wire, no risk of fire occurs."

In modern day very high powered electric motors the energy dissipating devices are in the form of resistor banks or solid state switches with large heat sinks.

v. Other Considerations

There are various other design and operational considerations relating to speed control, dynamic braking, and other design considerations for increasing efficiency (e.g. brush contact losses, field losses, friction, windage, hysterisis, eddy currents, etc.). Further there are practical constraints on the design of electric motors such as a maximum voltage levels imposed by certain design constraints, etc.

The present invention was designed to in large part eliminate (or at least alleviate) many of these problems, and also to provide an electrical machine with the versatility to operate efficiently in various modes which, in the prior art, can only be approached by making certain design compromises which dictate that the machine be particularly designed for that operating mode.

With the foregoing being given as background information, let us now direct our attention to the first preferred embodiment of the present invention.

c) Description of the First Preferred Embodiment

Figure 8:
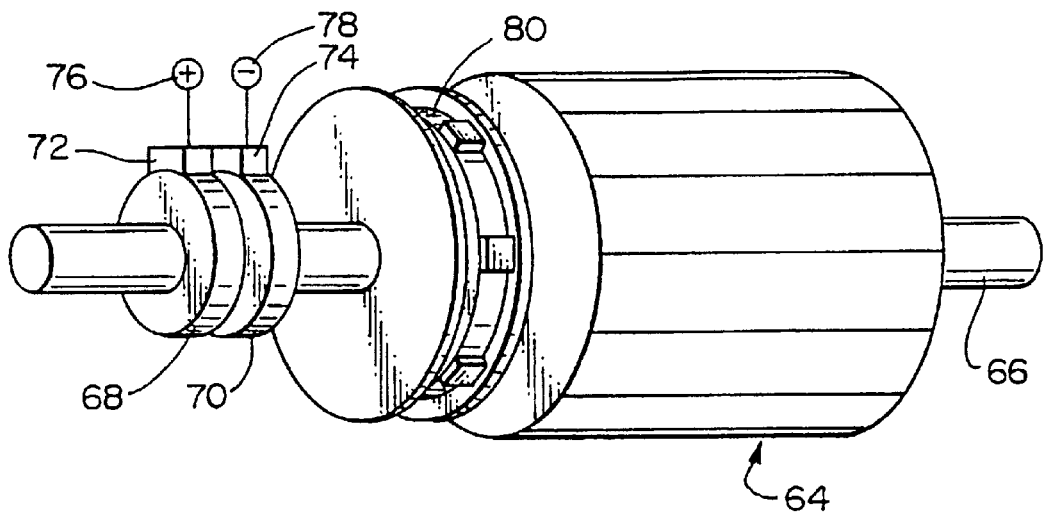
FIG. 8 is an isometric view of a preferred embodiment of the present invention.
Figure 9:
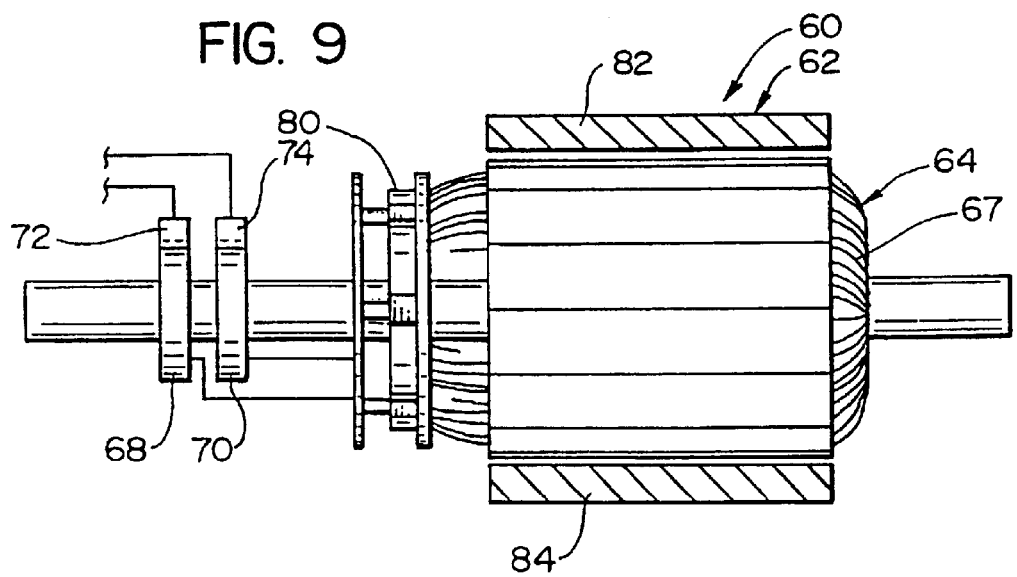
FIG. 9 is a side elevational view, partly in section, of the motor of FIG. 4.

Reference is initially made to FIGS. 8 and 9, which illustrates a first preferred embodiment. The engine 60 of the present invention (which could be used either as a motor or a generator) comprises a stator 62 and a rotor 64. (For ease of illustration, the stator 62 is not shown in FIG. 8). The rotor 64 comprises an output shaft 66 and a plurality of coil windings indicated generally at 67.

However, instead of having a commutator, as in the common prior art DC motor described in the previous sections, there are provided two slip rings 68 and 70, operatively engaging related brushes 72 and 74, which in turn are connected to plus and minus input terminals 76 and 78. Positioned operatively between the slip rings 74 and the rotor 64 is the control assembly 80 of the present invention. This control assembly 80 provides a variety of functions which will be described in more detail later herein.

To describe further the overall arrangement of the motor 60, the stator 62 is (or may be) substantially the same as the stator 12 of the prior art motor 10 described above, and thus would comprise a north pole 82 and a south pole 84. There are seven coils 67 wound in a manner similar to (or the same as) the coils 28 of the prior art motor, in that the coils 67 are wound to extend the length of the rotor parallel to the shaft 66. The coils 67 are connected in series, as described above with regard to the prior art motor. In addition, each end of each coil 67 is connected into the control package 80.

Figure 10:
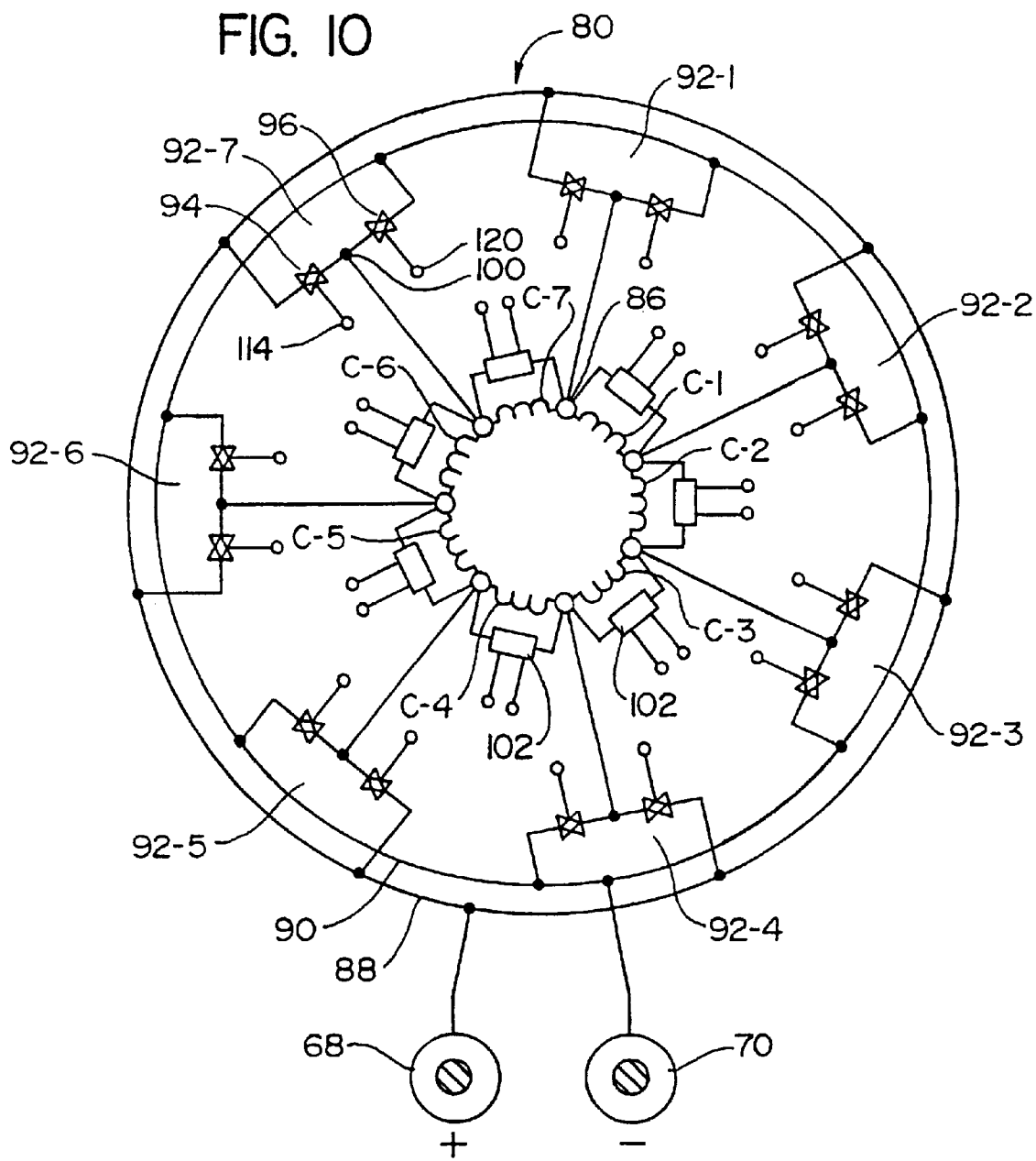
FIG. 10 is a schematic view illustrating the control package of the present invention.

Reference is now made to FIG. 10 where the motor 10 is shown schematically.

In the center of the schematic drawing in FIG. 10, there are shown the seven coils 67, which for purposes of description have been designated C1, C2, etc. through C7. The coils C1 through C7 are connected in a continuous series with an end portion of coil C1 being connected to an end of C2, with the other end of the coil C2 being connected to an end of coil C3, etc., until we arrive back at C7 being connected to the end of C1. The connecting points of the coils C1–C7 are each designated generally as 86.

There is a positive and a negative power bus 88 and 90, respectively, each of these being connected to a related one of the aforementioned slip rings shown as 68 and 70 (shown schematically in FIG. 10 as only plus and minus power inputs). There are seven power switch assemblies 92, these being designated 92-1 through 92-7. Each power switch assembly 92-1 through 92-7 is shown somewhat schematically in FIG. 10, and will be described more fully later herein with reference to FIG. 10.

Each switch assembly 92-1 through 92-7 comprises a positive power switch 94 and a negative power switch 96, connected to, respectively, the positive and negative buses 88 and 90. Each set of power switches 94 and 96 connect at a related common junction point 100, which in turn connects to a related terminal connection 86 between an adjacent pair of coils 67.

To comment briefly at this point on the operation of the present invention, it is evident that by turning on one positive power switch 94 of one switch assembly 92 and turning on a negative switch 96 of another switch assembly 92, current will flow through the activated positive switch 94 through the coil or coils connected between those switches. It becomes evident that by turning on and turning off the proper switches 94 and 96 of the switch assemblies in proper sequence and with the proper timing, the conducting pattern of the coils C1 through C7 can be controlled in an optimized manner.

There is also provided for each coil C1–C7 a related coil monitoring device 102. To describe the function of these briefly, each device 102 senses the current through its related coil. During start-up of the motor, these monitoring devices 102 are activated briefly to determine the relative position of each coil relative to the magnetic field of the stator 62. This enables the control circuitry (to be described hereinafter) to determine how the coils C1–C7 are to be energized to properly start the motor operating. In addition, these monitoring devices 102 perform other functions to be described later.

Figure 11:
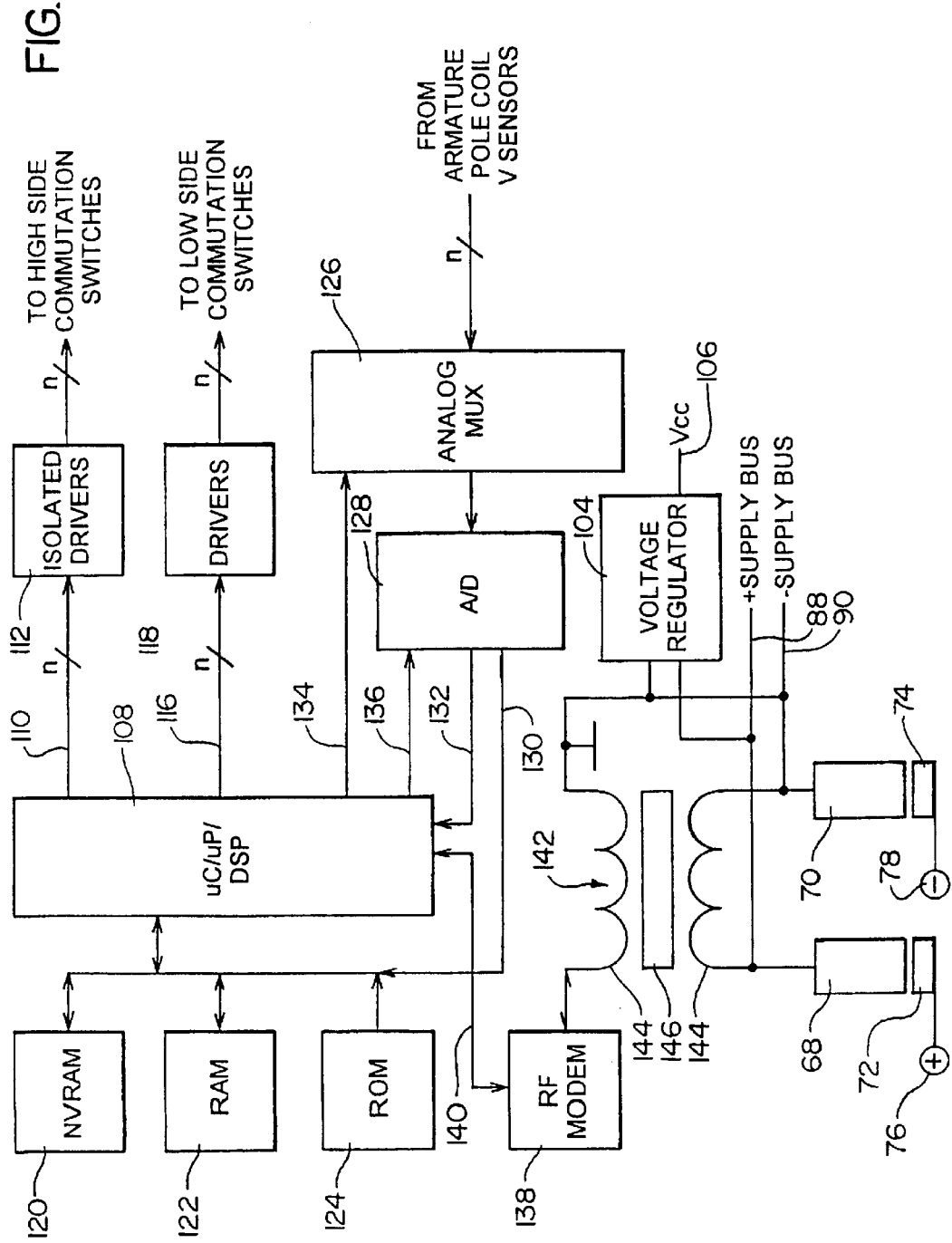
FIG. 11 is a schematic drawing of the control circuitry of the present invention.

The circuitry of the control assembly 80 of the present invention is shown in FIG. 11. The slip rings 68 and 70, brushes 72 and 74, power input terminal 76 and 78, and also the bus lines 88 and 90 are illustrated schematically in FIG. 11. There is an external control electronics unit 103 that is connected to the stator 62, and also connects to the brushes 72 and 74.

The control circuitry comprises a voltage regulator 104 connected to the bus lines 88 and 90 to provide one or more outputs 106 at a controlled lower voltage level to provide power to the various components of the control circuitry.

There is a micro processor 108 which can be, for example, either a micro controller (uC), a micro processor (uP), or a digital signal processor (DSP). This unit 108 will hereinafter simply be referred to as the micro processor 108. The micro processor 108 has operative connections (indicated schematically at 110) to a plurality of isolated drivers 112 which in turn are attached to respective input terminals 114 (see FIG. 6) of the high voltage power high-side switches 94. There is also a plurality of outputs 116 from the micro processor 108 which connect to a plurality of related (non-isolated) drivers 118, which in turn connect to the input terminals 120 of the low side switches 96. In response to the commands of the micro processor 108, the selected drivers of each set 112 and 118 give an on signal to their respective switches 94 or 96.

The NVRAM 120 is a non-volatile RAM which stores data even when the power is totally shut off. The type of data stored would be such things as motor control parameters, operational data, etc. The RAM 122 is what can be termed a "scratch pad" memory (read/write memory), used by the micro-processor for such things as general calculations, data storage, etc. The ROM 124 (read only memory) stores the program which runs the micro-processor.

An analog multiplexer 126 receives inputs from the pole coil voltage monitoring devices 102. The multiplexer 126 in turn outputs to the analog to digital convertor 128 which in turn transmits the data produced in the A/D converter 128 through the line 132 to the micro-processor 108. The analog to digital converter also communicates through the line 132 with the microprocessor 108 to indicate that it is ready to send data. Control signals from the microprocessor 108 are transmitted to both the multiplexer 126 and the analog digital computer 128 through the lines 134 and 136, respectively.

To provide communication with the "outside world" (a location exterior of the motor 10) there is provided a radio frequency modem 138 which has a communication link 140 with the microprocessor 108 and also with a coupling transformer 142 (comprising the two transformer coils 144 and the core 146) which in turn is connected to the two slip rings 68 and 70. This modem 138 provides a bi-directional coupling system by which low voltage radio frequency signals can be superimposed onto the large voltages flowing into the motor. Thus, information provided from the microprocessor 108 can be transmitted through the modem 138 to a location exterior of the motor 10, and information can be transmitted to the microprocessor from outside the motor 10. Alternatives are to use RF coupling via antennas or optical coupling.

Figure 12:
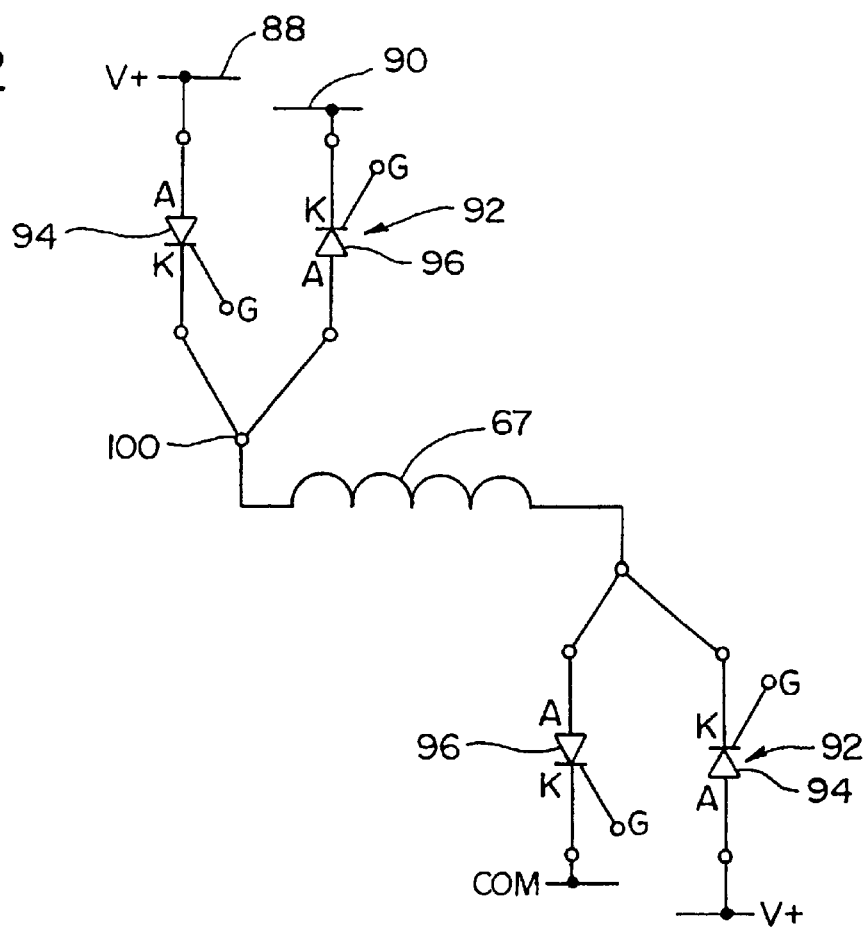
FIG. 12 illustrates one preferred embodiment of the control switches of the present invention, two control switches being shown.

FIG. 12 illustrates two of the power switch assemblies 92 positioned at different location in the motor. The power switch 94 comprises a silicon controlled rectifier (SCR) which has its anode connected to the high bus line 88, and its cathode connecting to the juncture point 100 that in turn connects to an end of a related coil 67. The power switch 96 also comprises an SCR, but is connected between the common bus line 90 and to an opposite end connection of the coil 67. The second switch assembly 92 at the lower right end of FIG. 12 is the same as the switch assembly 92 at the upper left part of FIG. 12, thus comprising two silicon controlled rectifiers 94 and 96 similarly connected to the buses 88 and 90.

It is evident by examining FIG. 12 that by turning on one SCR 94 of one switch 92 and simultaneously turning on the SCR 96 of a second switch assembly, current is going to flow through the first SCR 94 through one or more coils 67 to the SCR 96 of the other switch assembly 92 which is to be activated. It is to be understood, of course, that the coil 67 shown in FIG. 12 could actually be several coils in series.

One of the characteristics of the SCRs used in the switching current of FIG. 12 is that once the SCR 94 or 96 is turned on, it becomes latched, and it will not turn off until there is interruption of current. Therefore, in order to shut off the two switch assemblies 92 shown in FIG. 12, there is employed a switching circuit as shown in FIG. 13.

Figure 13:
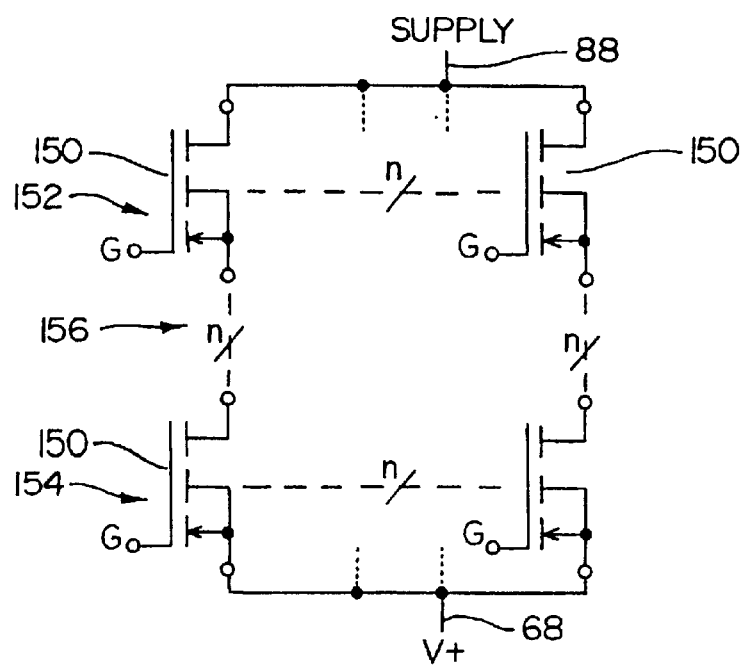
FIG. 13 shows another portion of the circuitry, which is an array of MOSFETS, having a switching function.

In FIG. 13 there is shown an array of MOSFETs 150 arranged both in series and in parallel. There is a first set 152 of MOSFETS 150 arranged in parallel and connected to the supply bus 88. There is a second set 154 of MOSFETS 150 connected in parallel with one another, but in series with the MOSFETS 150 of the first set 152, and in turn connected to the high voltage slip ring 68. There can also be provided additional sets of MOSFETS sets 156 of MOSFETS connected in parallel and in series between the two sets 152 and 154 of MOSFETS. The reason for this arrangement is that there can be a substantial amount of current flowing to the supply bus 88, and a MOSFET 150 in parallel enable such large amounts of currents to be carried. By placing the sets 152, 154 and 156 in series, the voltage drop across any one set of MOSFETS is reduced.

The MOSFETS in the switching circuit of FIG. 13 would normally remain conductive. However, when it is desired to shut off the SCRs 94/96 of the switch assemblies 92 which have been activated, the MOSFETS 150 in FIG. 13 are made non-conductive for a very short period of time to interrupt the current to the switch assemblies 92 of FIG. 12, thus shutting off the SCR's 94 and 96 that have been conductive. Since there would normally be only two SCR's 94 and 96 from different switching assemblies 92 on at any one time, this interruption of current does not have any significant adverse effect in the operation of the overall system.

Figure 14:
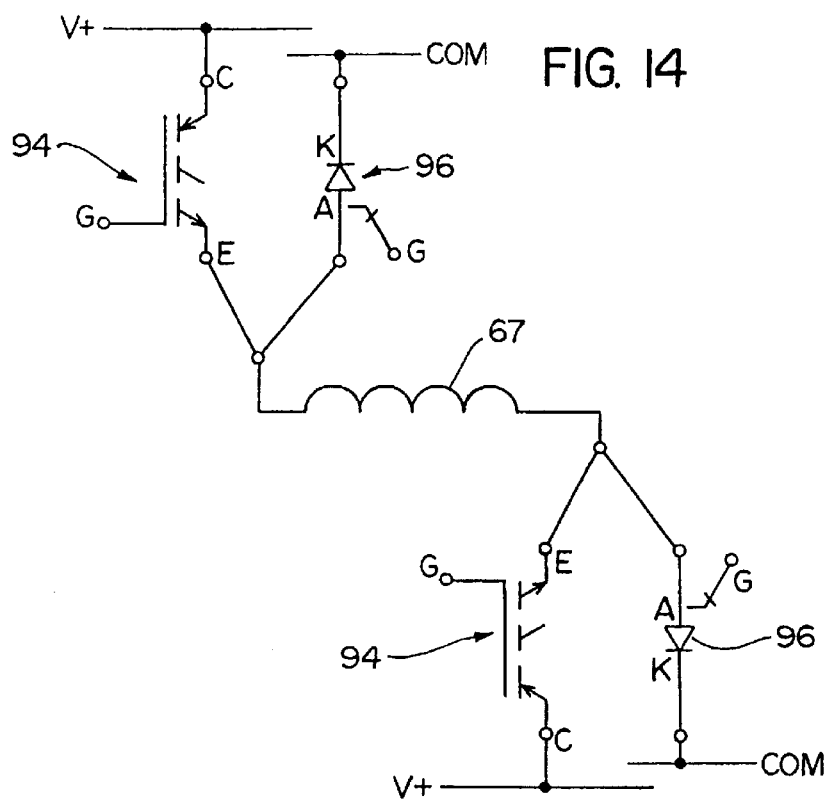
FIG. 14 is an alternative embodiment of the configuration shown in FIG. 9.

FIG. 14 shows an alternative arrangement for the circuitry shown in FIG. 12. The basic configuration of the circuitry in FIG. 14 is the same as in FIG. 12, except that the power switches 94 that are connected to the high voltage slip ring are (instead of being SCRs) insulated gate bipolar transistors (IGBT). Also, the power switches 96 that connect to the common slip ring 90 are MCT's.

The main difference in the circuitry of FIG. 14 is that both of these devices (the IGTB and the MCT) can be shut off without the necessity of interrupting current flow. Thus, by using the arrangement shown in FIG. 14, it is not necessary to use the current interruption switching circuit of FIG. 13. One benefit of using the circuitry of FIG. 12, or the circuitry of FIG. 13 is that overall, in terms of the prices which exist at the time the text of this patent application is being prepared, the cost of the arrangement of FIGS. 12 or 13 would likely be less than the alternative embodiment of FIG. 14. However, if the economics of supplying these components changes, it may turn out that the alternative embodiment FIG. 14 would be more desirable.

Figure 15:
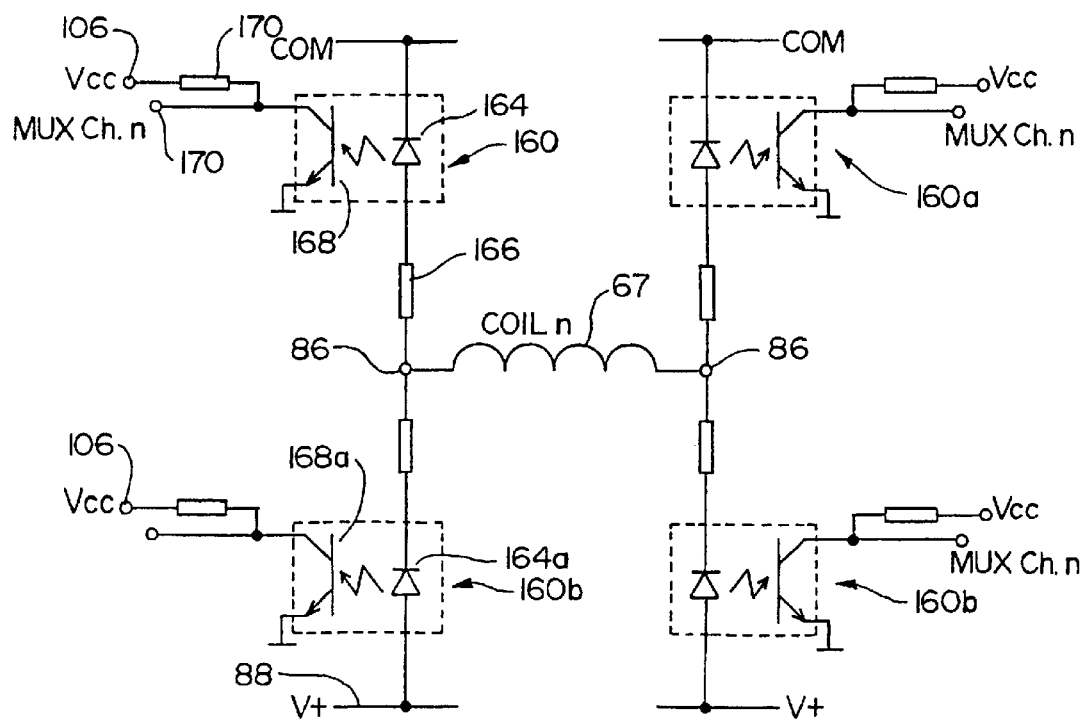
FIG. 15 shows a preferred embodiment of a monitoring circuit for the present invention.

Reference is now made to FIG. 15, which shows a preferred embodiment of a monitoring circuit 102 to sense the voltage at the juncture points 86 between one or more coils 67. For each juncture point 86, there are two circuit components 160 and 160*a*. The circuit component 160 comprises an LED 164 which is connected between the juncture point 86 and the common supply bus 90, with a resistor 166 being connected between the LED 164 and the juncture point 86. The brightness of the LED 164 is proportional to the current through the LED, which in turn would be proportional to the voltage between the juncture point 86 and the bus line 90.

The LED 164 is positioned to activate an opto-coupler 168, one terminal of which is connected through a resistor 170 to the voltage source 106 derived from the voltage regulator 104 (See FIG. 11). That same terminal of the opto-coupler 168 also connects to a terminal 172 of the multiplexer. When the opto-coupler 168 is not conductive, then the voltage at the multiplexer terminal 170 is at the voltage level of the voltage at 106. When the opto-coupler 168 is conductive, then current flows through the resistor 170, thus lowering the voltage level at the multiplexer terminal 170, to indicate the voltage at the juncture point 86.

The circuit component 160*a* operates in substantially the same way as the circuit component 160 except that the LED 164*a* is connected to the high voltage bus line 88. Thus, when the voltage at the juncture point 86 is the same as the voltage level at the common line 90, the current through the LED 164*a* would be at a maximum, to activate the opto-coupler 168*a* and cause a voltage drop at its related photocoupler terminal 170*a*. As the voltage at the juncture terminal 86 rises and reaches the voltage level of the high bus line 88, then no current would flow through the LED 164*a*, and the voltage at the multiplexer terminal 170*a* would thus be the same as at the voltage source 106. On the other hand, the LED 164 of the circuit component 160 would turn brighter, thus causing the opto-coupler 168 to be conductive and drop the voltage at the multiplexer terminal 170.

The sensing circuit of FIG. 15 provides galvanic isolation from the main bus lines 88 and 90. It is to be understood that other sensing methods could be employed, and still provide the galvanic isolation.

Figure 16:
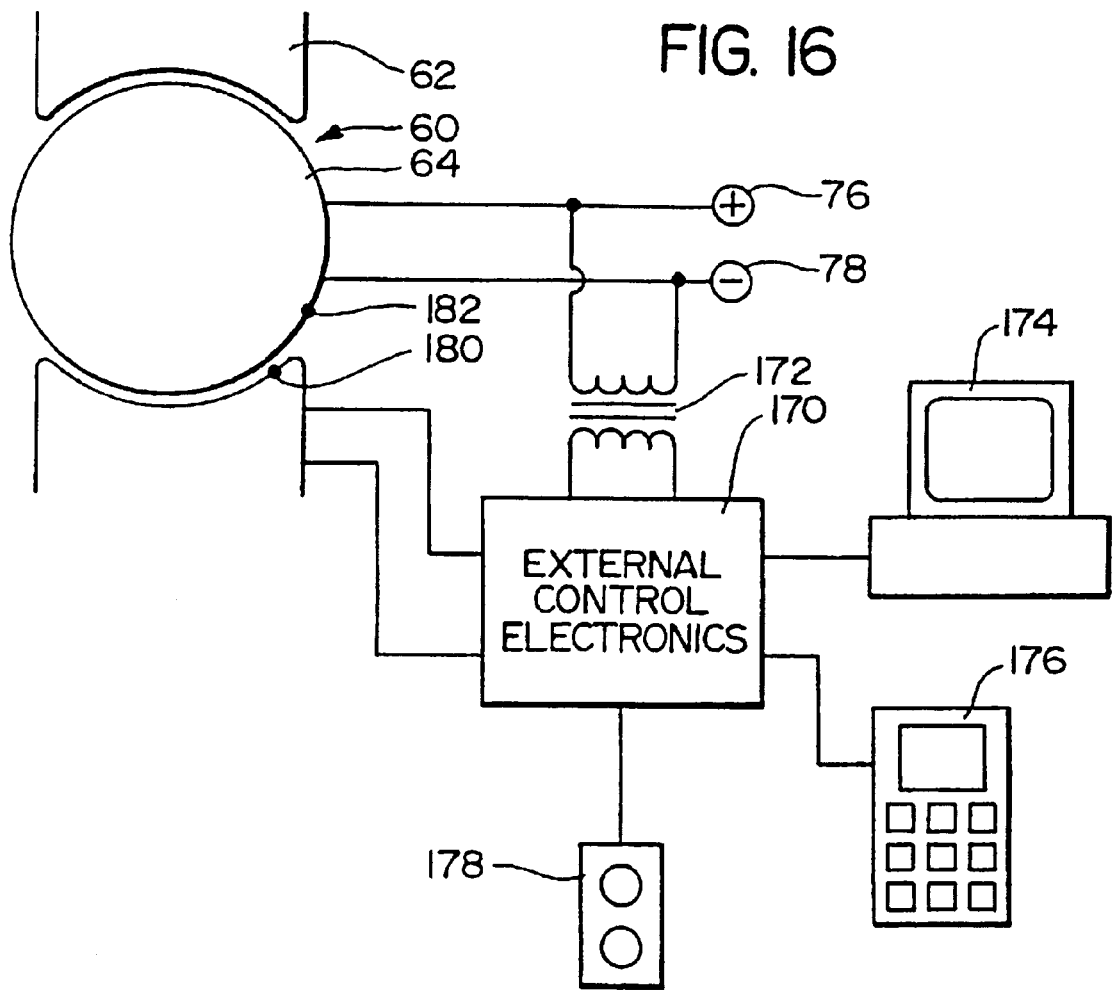
FIG. 16 is a schematic drawing showing the overall system of the present invention.

FIG. 16 is a schematic view showing the overall system of the present invention. In addition to the sensing and control components described thus far, there is shown in FIG. 16 a sensing means to provide information as to the location of the rotor at any time during its path of revolution.

This is to be provided quite simply by placing a stationary sensing member 180 on the stator (such as a permanent magnet or coil), and a corresponding sensing unit 182 on the rotor (such as a Hall effect sensor). Each time the rotor makes a complete revolution so that the sensing member 182 comes into proximity with the sensing member 180, a signal is transferred to the control assembly 80. Thus, this provides a means to ascertain the precise home index of the rotor 64 at any time in its operation.

In FIG. 16, there is shown the engine 60 comprising the stator 62 and the rotor 64 (shown rather schematically), with the control assembly 80 being incorporated in the rotor 64. There is provided an external control electronics unit 170 which is operatively connected through a transformer 172 to the power input terminals 76 and 78. The same unit 170 is also connected to the stator 62. One or more input sources can be provided for the external control of electronics unit. First, there is shown a computer 174; second a handheld terminal 176, and third a simple switch control device 178, which in this illustration is simply shown as an on/off switch. In actual practice, other operating controls could also be provided in the switch 178, such as speed control, power control, etc.

In operation, the unit 170 would control the current to the stator 62. In addition, this unit 170 would provide signal inputs to the control assembly 80 in the rotor 64, and return signals can be sent. The control assembly 80 would be preprogrammed so that it would have the full capacity to: (a) receive the instructions, and also the inputs from the sensors, (b) ascertain the operating conditions to optimize the performance of the motor (c) and give proper instructions to operate the switch assemblies 92 to carry out the instructions.

Each of the power switches 94 and 96 of each switch assembly 92 can be turned on and off very rapidly. By properly controlling the timing of the operation of the switches and also the duration of time on which these switches 94 and 96 are on and off, the following three operating components of the motor can be controlled, namely:

a. The rotational speed of the motor;
b. The power output to the motor;
c. Torque;
d. The phase angle of the motor As indicated previously, the basic operation of a DC electric motor is to direct the current through the appropriate coils and in the properly timed relationship so that the direction of current flow through each coil segment is in the correct direction so that there is the appropriate interaction between the coil field and the stator field to create the torque which is causing the rotation of the rotor. Then when this same coil is traveling out of that stator field and about to enter into the stator field of the opposite polarity, then the current must be reversed. Also, as indicated previously, the timing of this reversal relative to the magnetic fields that exist within the motor is critical for optimum operating efficiency of the motor.

In the prior art motor shown in FIG. 3, as described previously, the switching of the current passing through the armature coils is controlled by the commutator. In the present invention, as shown in FIG. 10, the switching is accomplished by the various switch assemblies 92 connected between the coils that are connected in series. It is to be understood, of course, that the coils 67 are shown rather schematically in FIG. 10, and in an actual commercial motor, these could be wound in a manner similar to the winding patterns already known in the prior art. For example, in the aforementioned Hehr and Harness book, beginning on page 203 and continuing on through page 216 various methods and patterns of winding the armature coils are given. These are given for bi-polar motors and multiple pole set motors.

In the arrangement shown in FIG. 10, if the coils C-1, C-2 and C-3 are to have current flowing in one direction, while the current through the coils C-7, C-6 and C-5 are to have the current flowing in the opposite direction, then the positive switch 94 and the switch assembly 92-1 would be made conductive, while the negative switches in the coil assemblies 92-4 and 92-5 would be conductive. The coil C-4, would be nonconductive, and this would be expected to occur at such time as the coil C-4 was between two adjacent stator fields. By causing the proper switching in each of the switch assemblies 92-1 through 92-7 in proper sequence, the armature coils will interact with the stator fields to cause rotation of the motor as previously described. To cause rotation of the rotor 64 at the desired rotational speed, the sequence of making the proper switching changes would be either accelerated or decelerated to accomplish greater or less RPM.

With regard to power input to the motor, for a given set of conditions (and also assuming that the efficiency remains the same), the power output is directly proportional to the current passing through the armature coils times the imposed voltage. In the present invention, the power can be controlled by controlling the amount of time which the current is flowing through each armature coil as it is passing through the stator fields. This could be controlled, for example, by switching the current on and off while the coil is passing through the field of that particular stator pole, and controlling the length of the pulses and the time lag between the pulses to obtain the desired power output. Alternatively, in some circumstances, it may be possibly simply to have a single continuous period of flow of current through the coil as it is passing through that particular stator field, and simply vary that time period.

With regard to controlling the phase angle at which armature current switches, this is done by shifting the time period when the switching occurs to reverse the current in the coils. Thus, with reference to FIG. 4, by delaying the switching, the switching point could be moved from the vertical (as shown in FIG. 4) to a more optimized position.

A desirable feature of the present invention is the versatility it provides. It will be recalled that earlier in this discussion, the different types of DC motors were discussed, and also their operating characteristics. These were summarized in FIG. 6. It will be recalled, for example, that as the load increases in a shunt wound motor, the speed will decrease to some extent. In the compound motor the decrease in speed is more pronounced as the current decreases. In the present invention, it is possible to maintain the speed substantially constant as the load increases. This is accomplished by maintaining the same switching rate for the armature coils, and then controlling the length of time that the current flows in the armature coils to control the torque and bring it to a level so that the current is sufficient to maintain the torque at the appropriate level to match the increase in load.

Another operating mode for which the present invention provides particular advantages is the start-up mode. Let us assume that the motor is stationary, and that it is desired to operate the motor with a sufficient torque to accelerate the motor as quickly as possible up to the desired operating speed, and yet not overheat the motor. It will be recalled that in prior discussions in this text, this was described as being accomplished in the prior art by dissipating a large percentage of the current generated through a resistance. This was explained with reference to FIG. 7.

On the other hand, with the present invention, the proper start-up torque is obtained by reducing the current to a sufficiently low level (e.g. by transmitting current for shorter periods and/or longer time gaps between the pulses). Thus, in the example given previously in this text where there is a motor which has a maximum practical operating capacity of 40 amps through the armature coils, when this motor is at a standstill and full power is directed through the armature coils, the armature current could go up as high as 550 amperes.

In the present invention, by turning the armature current on for shorter periods of time, the current flow can be maintained at the desired level to develop the desired torque necessary to start the motor rotating under full load, but keep the $I^2R$ losses within reasonable limits. This eliminates the need for the additional apparatus to dissipate large amounts of current as heat during start-up.

To explore another desirable feature of the present invention, it will be recalled that earlier in this text it was indicated that one of the serious operating problems in the prior art DC motors is the voltage spikes that can occur when the armature current is reversing, and how this can cause sparking in the brushes. Even though steps are taken in the prior art to alleviate the problem of sparking, these voltage spikes impose a serious limitation on DC motors, in that it limits the voltage differentials that can be employed. As a practical matter, in DC motors, the maximum practical voltage differential between adjacent brush connections should be kept below about 20 volts. Also, the necessity of keeping the voltage spikes to a sufficiently low level affects the overall design of the motor in that it limits the width of the gap between the adjacent surfaces of the stator and the rotor. The width of this gap affects the flux across the gap. If this gap is made too small, the flux density can reach a level which is sufficiently high so that the voltage spike is increased to the level where adverse sparking will occur (with prior art commutation) even though the proper design safeguards are employed.

In the present invention, the switching of the coils is accomplished without the prior art commutator. Thus, in the present invention, these voltage spikes can be accommodated by making the appropriate switch 94 or 96 in the switch assembly or assemblies 92 conductive for a very short period of time so that the voltage spike is directed into the appropriate power bus as useful power.

Figure 17:
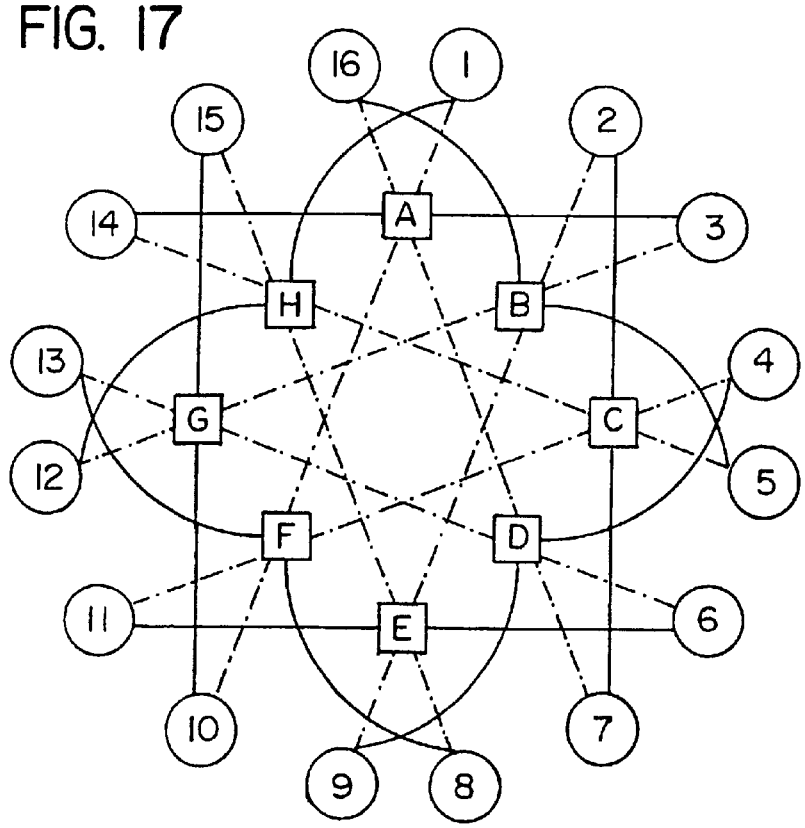
FIG. 17 is a somewhat schematic drawing illustrating the arrangement of the armature coils and the switch and the switches and the switches of a second embodiment of the present invention.

The switching arrangement of a second embodiment of the present invention is disclosed in FIG. 17. Since there is an even number of inductive armature coils, there will be more than one coil segment which is being switched at a given time. The voltage spike for each of these coil segments will be opposite to one another. These two voltage spikes can thus be directed simultaneously into the power buses so that these effectively would balance each other without power loss.

In FIG. 17 there are shown eight separate switches designated A through G. There are eight coils, and each of the numbers 1 through 16 represent individual coil segments. The coil segments are disposed diametrically opposite to one another. Thus, the segments 1 and 9 make up one coil, the segments 2–10 make up another coil segment, etc.

To describe the operation of the arrangement shown in FIG. 17, at any one time one of switch assemblies (such as shown at 92 in the prior embodiment) has the positive switch made conductive, while an opposite switch assembly has a negative switch made conductive. For example, if switch A is positive and switch E is negative, then there will be a flow of current in one direction through the coil segments on one side of the armature, and a flow of current in the opposite direction in the opposite side of the armature. Then when the next adjacent pair of switches are activated, and the switches in the switch assemblies A and B are turned off, the pattern of the current flow will switch so that the direction of current flows through the coils which are then adjacent to the north and south rotor poles will be traveling in the appropriate direction to continue the proper rotation of the motor.

Figure 18:
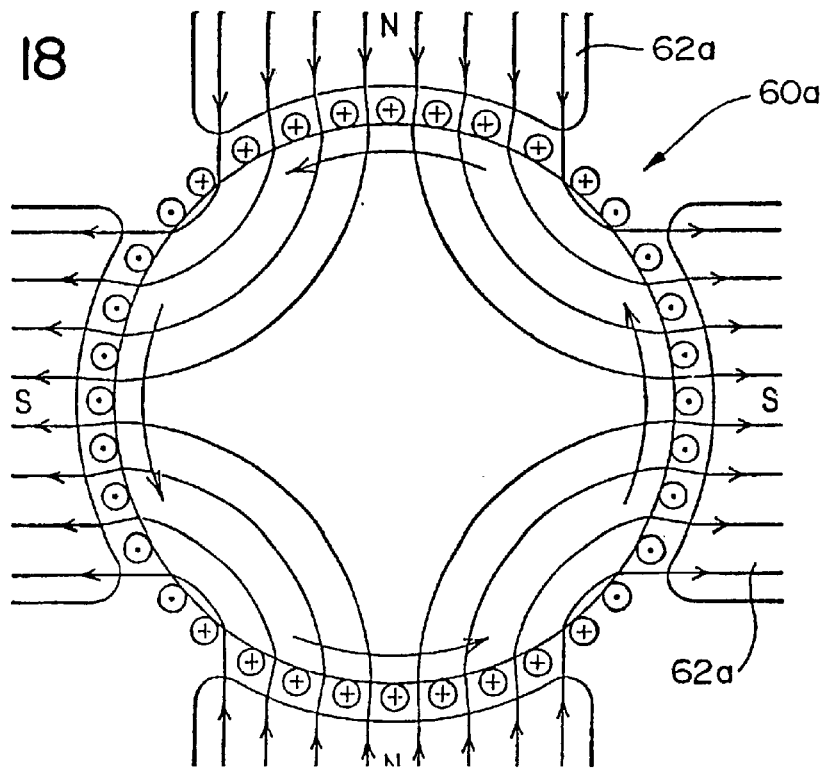
FIG. 18 is a schematic view of a third embodiment incorporating the present invention, where the stator comprises four field coils.

FIG. 18 shows a third embodiment of the present invention, where the a stator of the motor 60a comprising two north poles and two south poles, and there are eighteen coils. The switching between the coils is accomplished in generally the same manner as illustrated in FIG. 17. The embodiment of FIG. 18 is shown to illustrate that the present invention can be embodied in a motor where there are multiple north and south poles.

Figure 19:
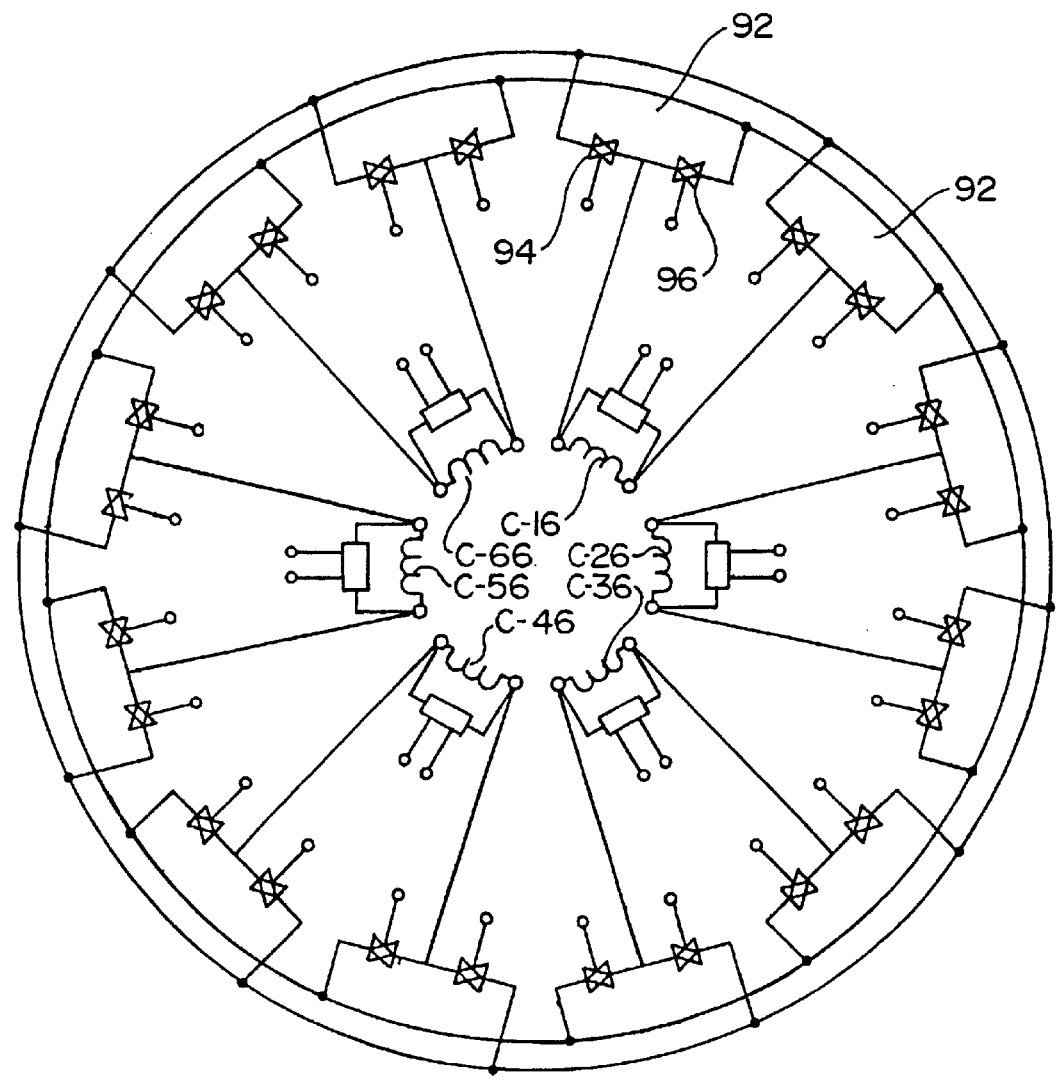
FIG. 19 is a schematic view of a fourth embodiment, with a modified switching arrangement where each coil has two switch assemblies.

FIG. 19 shows a fourth embodiment of the present invention. In this embodiment, there are six coils designated C-1b through C-6b. As in the first embodiment, there are switch assemblies 92, each having positive and negative switches 94 and 95. However, the individual coils C-1b through C-6b are not connected to one another in series. Rather, each end of each coil are connected to an individually related switch assembly 92.

Thus, in the operation of the embodiment of FIG. 19, each coil is made conductive by turning on the positive switch 94 of one of its related switch assemblies, and at the same time turning on the negative switch 96 of its other related switch assembly 92. This is done for each coil individually.

Figure 20:
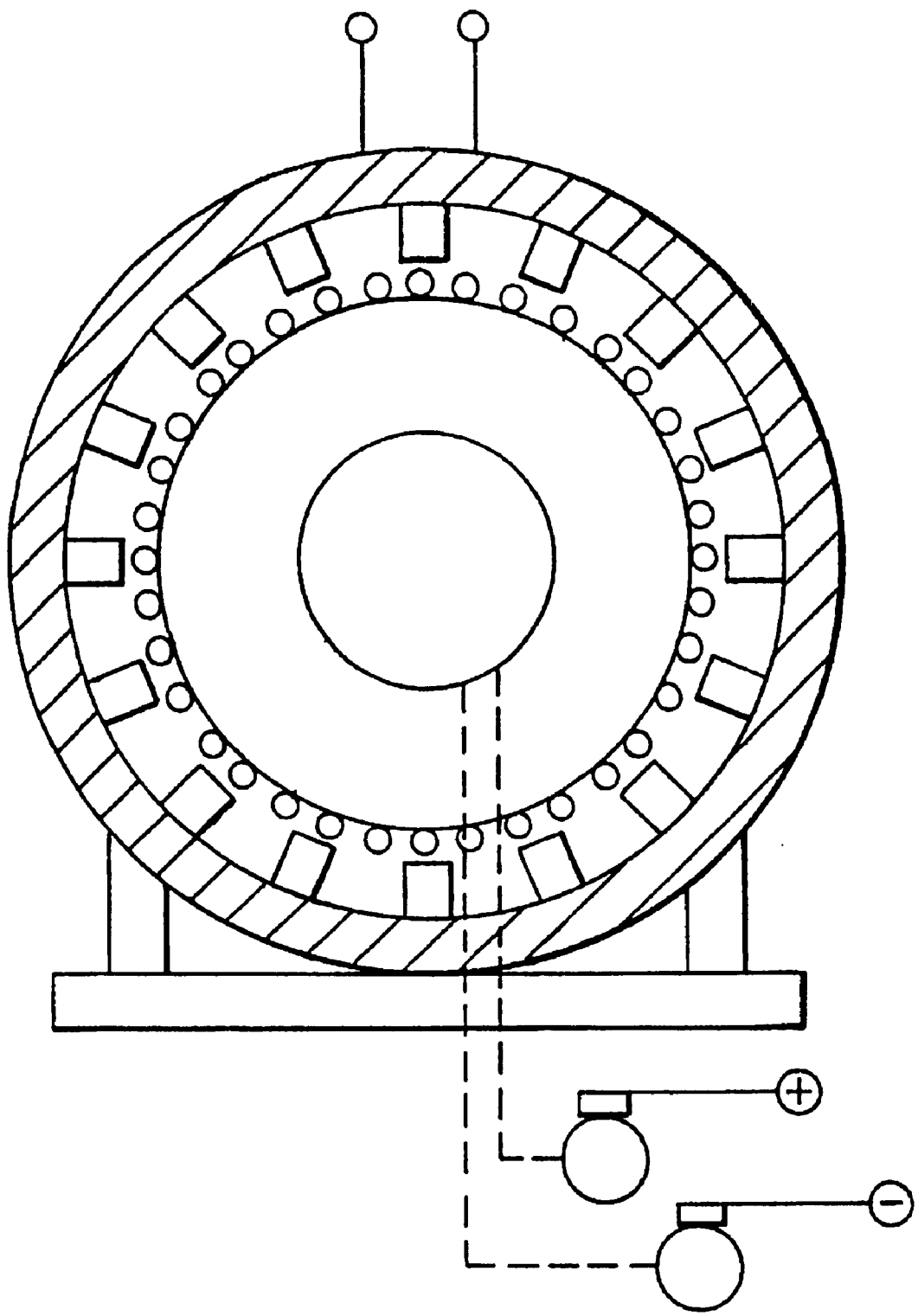
FIG. 20 is a schematic view illustrating the present invention incorporated in a motor having the basic operating design of a synchronous motor where alternating current is directed into the stator to create a field which moves synchronously circumferentially around the stator.

FIG. 20 shows a fifth embodiment of the present invention where the concept of the present invention is adapted to a design related to a synchronous motor. In a synchronous motor, the flux field is developed through an AC current so that the flux field travels a circumferential path around the stationary outer member (the "stator"). In a conventional synchronous motor, the rotor positioned within the stator often simply has permanent magnets with the poles of the magnet being positioned adjacent to the rotating flux field so that the rotational movement of the flux field interacts with the poles of the rotor poles to cause the rotor to rotate synchronously with the field traveling around the circumference of the stator.

To incorporate the present invention in the basic design of a synchronous motor, the rotor, instead of being provided as permanent magnets, is provided with an armature made in accordance with the present invention having the switching and control assembly of the present invention. The switching assembly of the armature is connected to DC field windings (as in the prior embodiments) where there are plus and minus brushes operatively connected to slip rings that rotate with the armature.

The operation of this fifth embodiment is substantially the same as in the first embodiment, except that the rotational movement of the flux field is superimposed, so as to be added or subtracted to the rotational movement caused by the switching of the armature currents in its coils. Thus, if the flux field is rotating counterclockwise, and the armature currents are switched so that these would cause clockwise rotation if the flux field were static, then the rotational component of travel provided by the switching of the armature currents would be added to the rotational component provided by the rotating flux field. On the other hand, if the current pattern in the armature is reversed to cause counterclockwise movement, then the clockwise rotational movement of the flux field and the rotational component of the armature would be subtracted from one another.

With regard to the advantage provided by incorporating the present invention in the general design of an AC synchronous motor, it will be recalled that earlier in this text it was mentioned that one of the drawbacks of this synchronous motor is that its rotational speed is dictated by the rotational speed of that of the field imposed on the synchronous motor. A further limitation was that the start-up torque was rather poor. However, by using the principles of the present invention in such motor, the rotational speed can be varied all the way from zero to a speed substantially greater than the rotational speed of the field. Thus, the utilization of the present invention in this particular embodiment creates greater versatility in the selection of its operating modes.

In the earlier part of the text of this patent application, it was indicated that the apparatus of the present invention can operate as either a motor or a generator. This is true of all the embodiments disclosed herein. Accordingly, while much of the description herein has been directed specifically toward the use of the present invention where the machine operates as a motor, the same principles could be incorporated in this same or similar apparatus being used as a generator.

To review rather briefly how this is done. When the apparatus is used for the generator, the power input is a mechanical power input which supplies power to the armature to rotate the armature. The inductive coils move through the stator field to cause current to flow through the armature coils, and this current flows through the control assembly 80 through the slip rings 68 and 70 and are delivered to the brushes 72 and 74 as direct current. The operation as a motor has been described earlier herein in detail, so this will not be repeated.

It should be understood that various modification could be made to the present invention without departing from the basic teachings thereof.

Therefore, I claim:

1. A dynamo-electric machine, comprising:
   a. a field member having north and south magnetic pole portions to create a flux field extending between said magnetic pole portions;
   b. an armature assembly rotatably mounted in said machine to rotate through said flux field, said armature assembly comprising:
      i. a core positioned in said flux field;
      ii. coil means comprising a plurality of induction coils positioned adjacent to said core and positioned to move through said flux field during rotation of said armature assembly;
      iii. switch means mounted to said armature assembly so as to be rotatable therewith, said switch means being operatively connected to said coil means, in a manner that current can be caused to flow selectively through said coil means in a manner to cause a desired interaction of said coil means in said flux field;
   c. mechanical power transfer means connected to said armature assembly so as to be rotatable therewith in power transmitting relationship;
   d. electrical power transfer means for transferring power between said armature assembly and stationary terminals on said field member;
   e. said switch means being connected with said electrical power transfer means and said coil means so that current between said electrical power transfer means and said coil means is selectively controlled by said switch means; and
   f. control means responsive to sensed analog characteristics of said flux field to operate said switch means to control direction and timing of current in said coils;

whereby current flow in said coils can be optimized to accomplish desired power transfer between the electrical power transfer means and the mechanical power transfer means.

2. The machine as recited in claim 1, wherein said electrical power transfer means is a direct current electrical power transfer means.

3. The machine as recited in claim 2, wherein said electrical power transfer means comprises slip ring means rotatably mounted to said armature assembly and brush means operatively engaging said slip ring means.

4. The machine as recited in claim 3, wherein said control means is positioned in said armature assembly so as to be rotatable therewith and control signals to said control means are transmitted through said electrical power transfer means.

5. The machine as recited in claim 1, wherein said control means is positioned in said armature assembly so as to be rotatable therewith.

6. The machine as recited in claim 1, including field sensing means positioned relative to said flux field to ascertain analog characteristics of said flux field, said sensing means being operatively connected to said control means to enable the control means to modify timing of the switch means to accomplish proper relationship of the switching relative to the flux field.

7. The machine as recited in claim 6, wherein said field sensing means comprises a plurality of sensors positioned adjacent to related coils to sense current change and/or condition in related coils.

8. The machine as recited in claim 7, wherein each of said sensors comprises sensor coil means responsive to the flux field, and means responsive to voltage modification in the sensor coil means to send a corresponding signal to said control means.

9. The machine as recited in claim 1, wherein said machine functions as a motor where DC current is directed through said electrical power transfer means to supply power to said armature assembly and cause rotation of said mechanical power transfer means.

10. The machine as recited in claim 1, wherein said machine is operated as a generator, and power is delivered to said mechanical power transfer means to cause rotation of said mechanical power transfer means, to generate electricity in said armature assembly which is transmitted to said electrical power transfer means.

11. The machine as recited in claim 1, wherein said field member comprises static north and south magnetic pole portions so as to provide a static magnetic field.

12. The machine as recited in claim 1, wherein said field member generates a moving flux field which moves circumferentially around said field member.

* * * * *